(12) United States Patent
Endozo et al.

(10) Patent No.: US 9,455,110 B2
(45) Date of Patent: Sep. 27, 2016

(54) TWO-POLE CIRCUIT BREAKERS

(71) Applicants: Joselito Endozo, Dacula, GA (US);
Russell Thomas Watford,
Lawrenceville, GA (US)

(72) Inventors: Joselito Endozo, Dacula, GA (US);
Russell Thomas Watford,
Lawrenceville, GA (US)

(73) Assignee: SIEMENS INDUSTRY, INC.,
Alpharetta, GA (US)

( * ) Notice: Subject to any disclaimer, the term of this patent is extended or adjusted under 35 U.S.C. 154(b) by 597 days.

(21) Appl. No.: 14/024,041

(22) Filed: Sep. 11, 2013

(65) Prior Publication Data

US 2015/0070801 A1    Mar. 12, 2015

(51) Int. Cl.
| | |
|---|---|
| *H02H 9/08* | (2006.01) |
| *H01H 73/00* | (2006.01) |
| *H02H 3/00* | (2006.01) |
| *H02H 3/16* | (2006.01) |
| *H02H 3/10* | (2006.01) |
| *H01H 71/10* | (2006.01) |
| *H01H 83/22* | (2006.01) |
| *H01H 71/12* | (2006.01) |

(52) U.S. Cl.
CPC ......... *H01H 73/00* (2013.01); *H01H 71/1009* (2013.01); *H01H 83/226* (2013.01); *H02H 3/00* (2013.01); *H02H 3/10* (2013.01); *H02H 3/16* (2013.01); *H01H 2071/124* (2013.01)

(58) Field of Classification Search
USPC .......................................................... 361/42
See application file for complete search history.

(56) References Cited

U.S. PATENT DOCUMENTS

| | | | |
|---|---|---|---|
| 7,515,022 B2 | 4/2009 | Zindler | |
| 8,369,052 B2 | 2/2013 | McCoy | |
| 8,988,174 B1* | 3/2015 | Watford | ............. H01H 71/1009 335/10 |
| 2005/0073780 A1 | 4/2005 | Elms | |
| 2005/0103613 A1 | 5/2005 | Miller | |
| 2010/0020453 A1 | 1/2010 | McCoy | |
| 2015/0068881 A1* | 3/2015 | Watford | ............. H01H 71/1009 200/5 R |
| 2015/0070113 A1* | 3/2015 | Watford | ............. H01H 71/1009 335/9 |
| 2015/0070801 A1* | 3/2015 | Endozo | ................... H01H 73/00 361/2 |
| 2016/0042898 A1* | 2/2016 | Watford | ................. H01H 9/047 337/112 |

FOREIGN PATENT DOCUMENTS

WO    2007123389 A1    11/2007

OTHER PUBLICATIONS

European Search Report mailed Feb. 23, 2015 corresponding to European Application No. 14181444.2 filed Aug. 19, 2014 (8 pages).

* cited by examiner

*Primary Examiner* — Ronald W Leja

(57) ABSTRACT

A two-pole circuit breaker is provided that includes a first mechanical pole, a second mechanical pole and an electronic pole. The first mechanical pole includes a first armature having a first armature extension, and the second mechanical pole includes a second armature having a second armature extension. The electronic pole includes a first solenoid and a second solenoid, the first armature extension is disposed adjacent the first solenoid, and the second armature is disposed adjacent the second solenoid. Numerous other aspects are provided.

16 Claims, 19 Drawing Sheets

TWO-POLE CIRCUIT BREAKERS

BACKGROUND

This application relates to two-pole circuit breakers. Example embodiments include ground fault circuit interrupt two-pole residential circuit breakers, arc fault circuit interrupt two-pole residential circuit breakers, and combination arc fault and ground fault circuit interrupt two-pole residential circuit breakers.

SUMMARY

In a first aspect, a two-pole circuit breaker is provided that includes a first mechanical pole, a second mechanical pole and an electronic pole. The first mechanical pole includes a first armature having a first armature extension, and the second mechanical pole includes a second armature having a second armature extension. The electronic pole includes a first solenoid and a second solenoid, the first armature extension is disposed adjacent the first solenoid, and the second armature is disposed adjacent the second solenoid.

In a second aspect, an electronic pole is provided for use with a two-pole circuit breaker having a first mechanical pole and a second mechanical pole. The electronic pole includes a trip detection circuit having a first output signal node and a second output signal node, a first trip generator circuit having an input coupled to the first output signal node, and a second trip generator circuit having an input coupled to the second output signal node. The trip detection circuit provides a first output signal on the first output signal node when the first mechanical pole trips, and provides a second output signal on the second output signal node when the second mechanical pole trips.

In a third aspect, a two-pole circuit breaker is provided that includes a first mechanical pole, a second mechanical pole and an electronic pole. The electronic pole includes a trip detection circuit that has a fault detection circuit coupled to a first trip detector circuit and a second trip detector circuit.

Other features and aspects of the present invention will become more fully apparent from the following detailed description, the appended claims and the accompanying drawings.

BRIEF DESCRIPTION OF THE DRAWINGS

Features of the present invention can be more clearly understood from the following detailed description considered in conjunction with the following drawings, in which the same reference numerals denote the same elements throughout, and in which.

DETAILED DESCRIPTION

Two-pole circuit breakers, such as residential two-pole circuit breakers, have two electrical branches or poles through which electrical power is provided to one or more loads. For example, in the United States, residential two-pole circuit breakers typically provide 240 volts instead of 120 volts to devices or appliances such as electric dryers, water heaters, well pumps, and/or electric ranges. Previously known two-pole circuit breakers typically include an electronic pole disposed between first and second mechanical poles. A trip bar typically extends through the electronic pole and communicates with the first and second mechanical poles.

If an overcurrent or short circuit is sensed in one pole, the faulted mechanical unlatches, and the pole trips. In addition, the electronic pole may include an arc fault or a ground fault detector circuit that continuously monitors current flowing in each mechanical pole. If an arc fault or a ground fault occurs in either mechanical pole, the detector circuit activates a single wound solenoid to trip and unlatch the faulted mechanical pole. As the faulted mechanical pole unlatches, the trip bar rotates, and the rotation causes the other mechanical pole to trip and unlatch.

Such a previously known electrical/mechanical tripping mechanism seeks to ensure that when either mechanical pole trips, the other pole also trips, known as a "common trip." A two-pole circuit breaker that does not common trip could potentially be a safety concern to end users, and must be avoided. Previously known two-pole circuit breakers that include a trip bar, however, have numerous disadvantages.

In particular, use of a trip bar may require several production instructions during manufacture, and special fixtures may be needed to ensure that the trip bar is correctly assembled. In addition, key features of the trip bar may have very tight tolerances that need close monitoring to ensure that required drawing specifications are satisfied.

Moreover, during assembly of the circuit breaker, numerous components within the circuit breaker typically must be precisely aligned to properly align the trip bar. Improper trip bar alignment could result in binding conditions that prevent the trip bar (and therefore the circuit breaker) from properly operating. As a result, previously known two-pole circuit breaker designs often require substantial monitoring of the trip bar during assembly. Apparatus and methods in accordance with this invention provide a two-pole circuit breaker that common trips, but that does not include a trip bar.

Figure 1A:
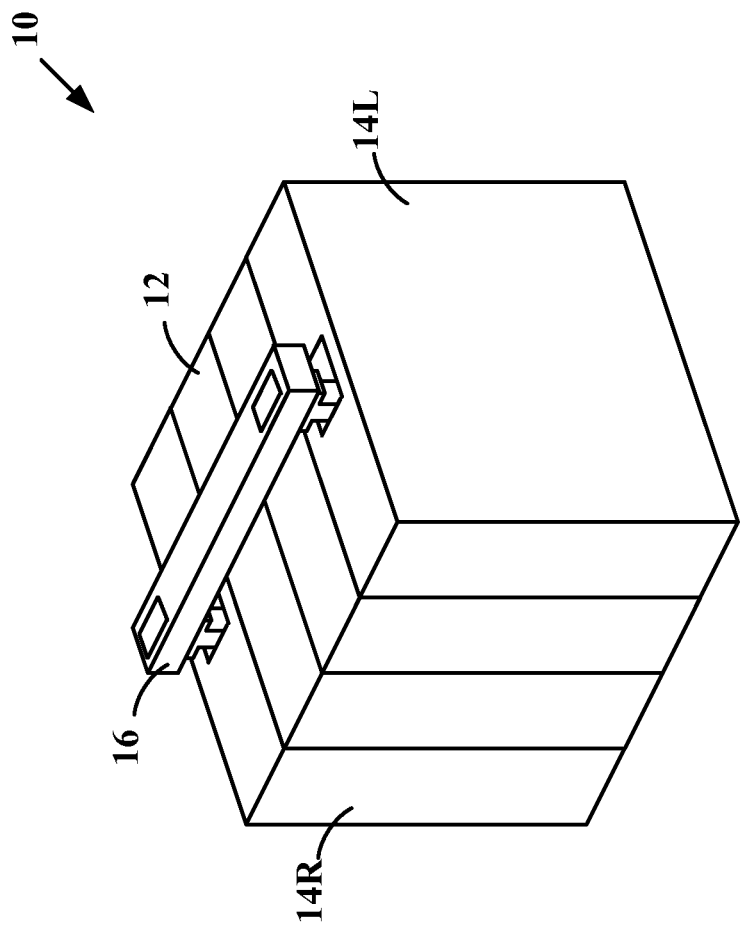
FIGS. 1A-1C are diagrams of an example two-pole circuit breaker in accordance with this invention.
Figure 1B:
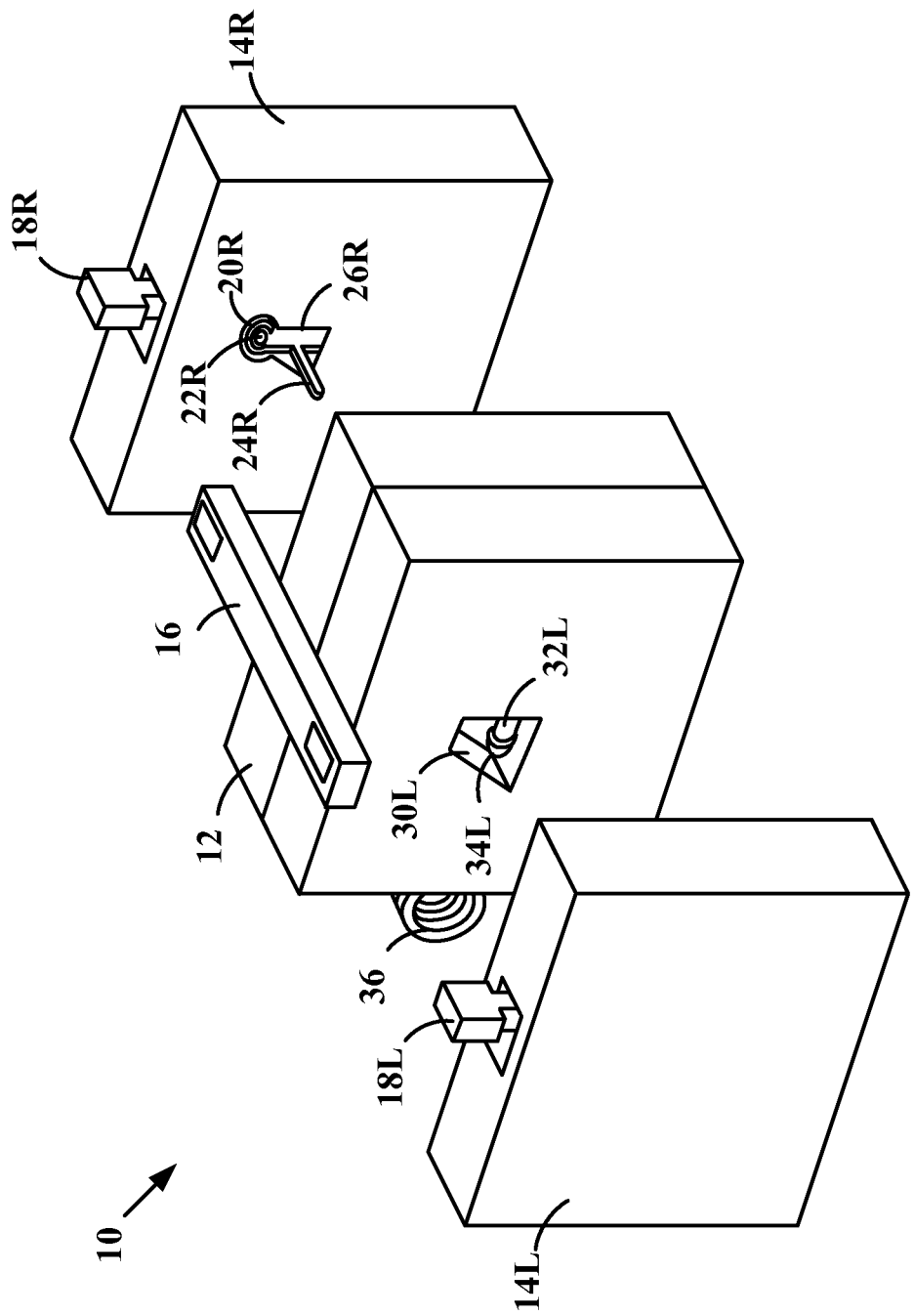
Figure 1C:
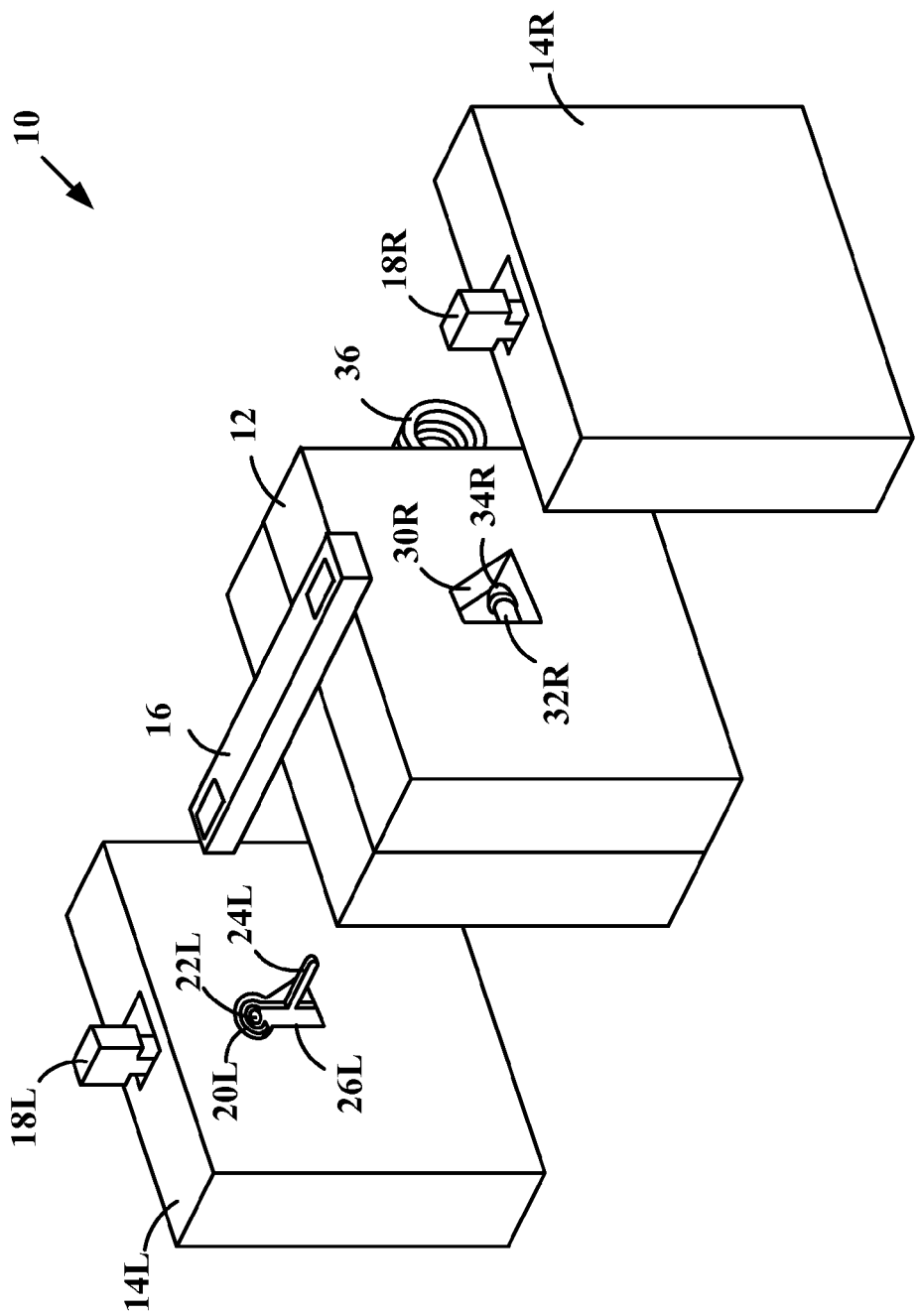

Referring to FIGS. 1A-1C, an example two-pole circuit breaker 10 in accordance with this invention is described. Example circuit breaker 10 includes an electronic pole 12 disposed between a first mechanical pole 14L and a second mechanical pole 14R, and a handle tie bar 16 coupled to first and second handles 18L and 18R, respectively, on first mechanical pole 14L and second mechanical pole 14R, respectively. Handle tie bar 16 may be used to simultaneously operate first and second handles 18L and 18R, respectively, to turn circuit breaker 10 ON and OFF. In some embodiments, the electronic pole 12 may be otherwise located (e.g., not between the first and second mechanical poles 14L and 14R, such as behind or in front one or both of the mechanical poles 14L and 14R).

First mechanical pole 14L includes a first armature 20L disposed on a first armature pivot 22L, and includes a first armature extension 24L that extends through a first mechanical pole aperture 26L. Second mechanical pole 14R includes a second armature 20R disposed on a second armature pivot 22R, and includes a second armature extension 24R that extends through a second mechanical pole aperture 26R.

As shown in FIGS. 1B-1C, electronic pole 12 includes a first aperture 30L and a second aperture 30R. A first solenoid plunger 32L having a tip 34L is disposed in first aperture 30L, and a second solenoid plunger 32R having a tip 34R is disposed in second aperture 30R. In addition, electronic pole 12 optionally includes a pigtail 36 which may be used to connect a neutral conductor (not shown) in circuit breaker 10 to a load center or panel board neutral bar (not shown).

Figure 2A:
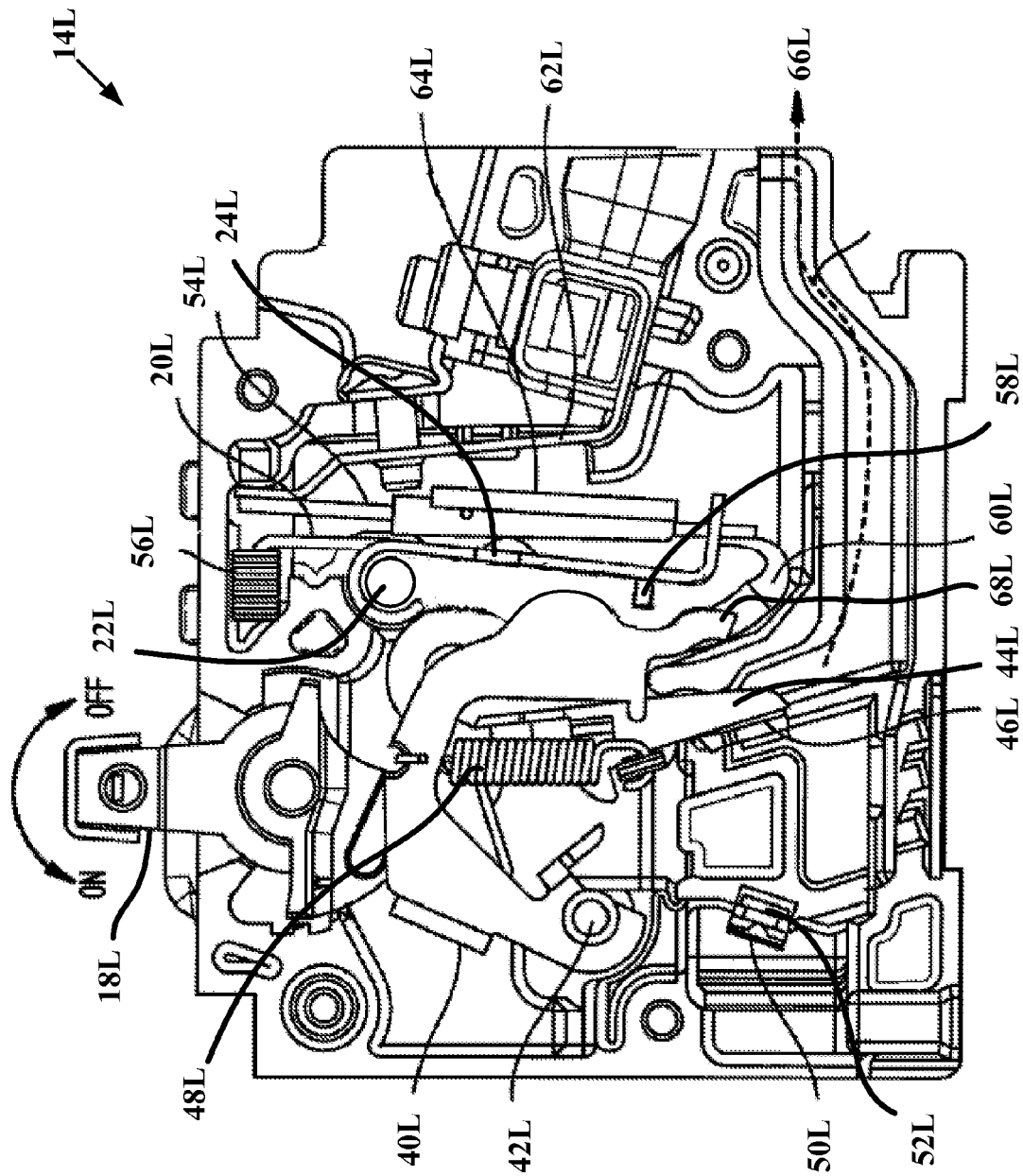
FIGS. 2A-2D are diagrams of example internal components of a mechanical pole in accordance with this invention.

Referring now to FIGS. 2A-2D, example components and operation of first mechanical pole 14L and second mechanical pole 14R are now described. In particular, FIG. 2A illustrates example internal components of first mechanical pole 14L. First mechanical pole 14L includes first handle 18L, first armature 20L disposed on first armature pivot 22L, a first cradle 40L disposed on a first cradle pivot 42L, a first moveable bus 44L that includes a first moveable contact 46L and is coupled via a first spring 48L to first cradle 40L, and a first stationary bus 50L that includes a first stationary contact 52L disposed opposite first moveable contact 46L. A first compression spring 56L biases first armature 20L in a clockwise direction about first armature pivot 22L. First armature 20L includes first armature extension 24L and a first projection 58L.

First moveable bus 44L is connected to a first bi-metal strip 54L by a first flexible conductor 60L. A first load terminal 62L is connected to a top end of first bi-metal strip 54L, and also is coupled to a first short-circuit sensing element 64L. As described in more detail below, first bi-metal strip 54L and first short-circuit sensing element 64L are used to provide overcurrent and instantaneous tripping functions, respectively. A first channel 66L directs any arc discharge gas resulting from a short circuit away from first mechanical pole 14L. First cradle 40L includes a first end 68L disposed adjacent first projection 58L of first armature 20L.

First handle 18L is coupled to an upper end of first moveable bus 44L, and may be used to selectively turn first mechanical pole 14L ON and OFF, and thereby selectively CLOSE and OPEN, respectively, first moveable contact 46L and first stationary contact 52L. In particular, moving first handle 18L to the ON position causes first moveable bus 44L to move in a clockwise direction, which causes first moveable contact 46L and first stationary contact 52L to CLOSE. In contrast, moving first handle 18L to the OFF position causes first moveable bus 44L to move in a counter-clockwise direction, which causes first moveable contact 46L and first stationary contact 52L to OPEN.

A latch system of first mechanical pole 14L activates when first handle 18L is moved from the OFF position to the ON position. In particular, as first handle 18L is rotated towards the ON position, first cradle 40L rotates counter-clockwise. As first cradle 40L rotates, first end 68L rotates past first projection 58L of first armature 20L. First armature 20L rotates clockwise towards first cradle 40L as a result of first compression spring 56L pushing on the top of first armature 20L, and first projection 58L of first armature 20L passes under first end 68L of first cradle 40L. When first handle 18L is released, first cradle 40L rotates clockwise until first end 68L of first cradle 40L engages first projection 58L of first armature 20L, latching first mechanical pole 14L ON.

Although not shown in FIG. 2A, persons of ordinary skill in the art will understand that second mechanical pole 14R includes the same components as first mechanical pole 14L, albeit with "R" reference number designations. That is, second mechanical pole 14R includes handle 18R, second armature 20R disposed on second armature pivot 22R, a second cradle 40R disposed on a second cradle pivot 42R, a second moveable bus 44R that includes a second moveable contact 46R and is coupled via a second spring 48R to second cradle 40R, and a second stationary bus 50R that includes a second stationary contact 52R disposed opposite second moveable contact 46R. A second compression spring 56R biases second armature 20R in a clockwise direction about second armature pivot 22R. Second armature 20R includes second armature extension 24R and a second projection 58R.

Second moveable bus 44R is connected to a second bi-metal strip 54R by a second flexible conductor 60R. A second load terminal 62R is connected to a top end of second bi-metal strip 54R, and also is coupled to a second short-circuit sensing element 64R. As described in more detail below, second bi-metal strip 54R and second short-circuit sensing element 64R are used to provide overcurrent and instantaneous tripping functions, respectively. A second channel 66R directs any arc discharge gas resulting from a short circuit away from second mechanical pole 14R. Second cradle 40R includes a second end 68R disposed adjacent second projection 58R of second armature 20R.

Second handle 18R is coupled to an upper end of second moveable bus 44R, and may be used to selectively turn second mechanical pole 14R ON and OFF, and thereby selectively CLOSE and OPEN, respectively, second moveable contact 46R and second stationary contact 52R. In particular, moving second handle 18R to the ON position causes second moveable bus 44R to move in a clockwise direction, which causes second moveable contact 46R and second stationary contact 52R to CLOSE. In contrast, moving second handle 18R to the OFF position causes second moveable bus 44R to move in a counter-clockwise direction, which causes second moveable contact 46R and second stationary contact 52L to OPEN.

A latch system of second mechanical pole 14R activates when second handle 18R is moved from the OFF position to the ON position. In particular, as second handle 18R is rotated towards the ON position, second cradle 40R rotates counter-clockwise. As second cradle 40L rotates, second end 68R rotates past second projection 58R of second armature 20L. Second armature 20R rotates clockwise towards second cradle 40R as a result of second compression spring 56R pushing on the top of second armature 20R, and second projection 58R of second armature 20R passes under second end 68R of second cradle 40R. When second handle 18R is released, second cradle 40R rotates clockwise until second end 68R of second cradle 40R engages second projection 58R of second armature 20R, latching second mechanical pole 14R ON.

Figure 2B:
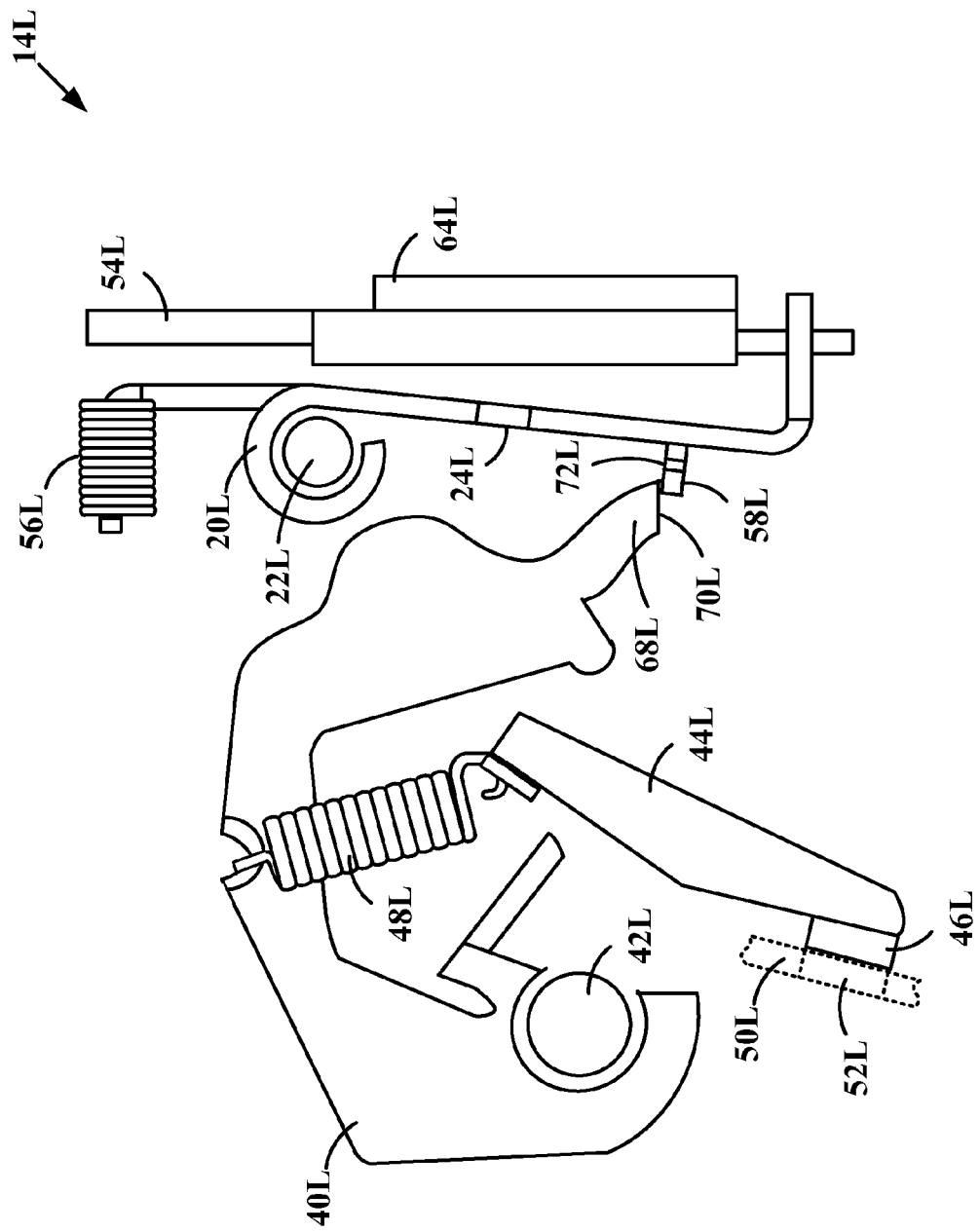

FIG. 2B illustrates an enlarged view of select components of first mechanical pole 14L in the latched ON configuration. In particular, a first surface 70L of first end 68L makes engaging contact with a first top surface 72L of first projection 58L, preventing further clockwise rotation of first cradle 40L. In the latched ON configuration, first moveable bus 44L is adjacent first stationary bus 50L, and first movable contact 46L and first stationary contact 52L are CLOSED.

First mechanical pole 14L remains latched ON until first handle 18L is moved to the OFF position, or until an overload condition or a short circuit condition causes the latch mechanism to disengage and trip first mechanical pole 14L. As described in more detail below, in embodiments in which two-pole circuit breaker 10 also includes ground fault and/or arc fault circuit detection functions, a ground fault and/or an arc fault also cause the latch mechanism to disengage and trip first mechanical pole 14L.

Figure 2C:
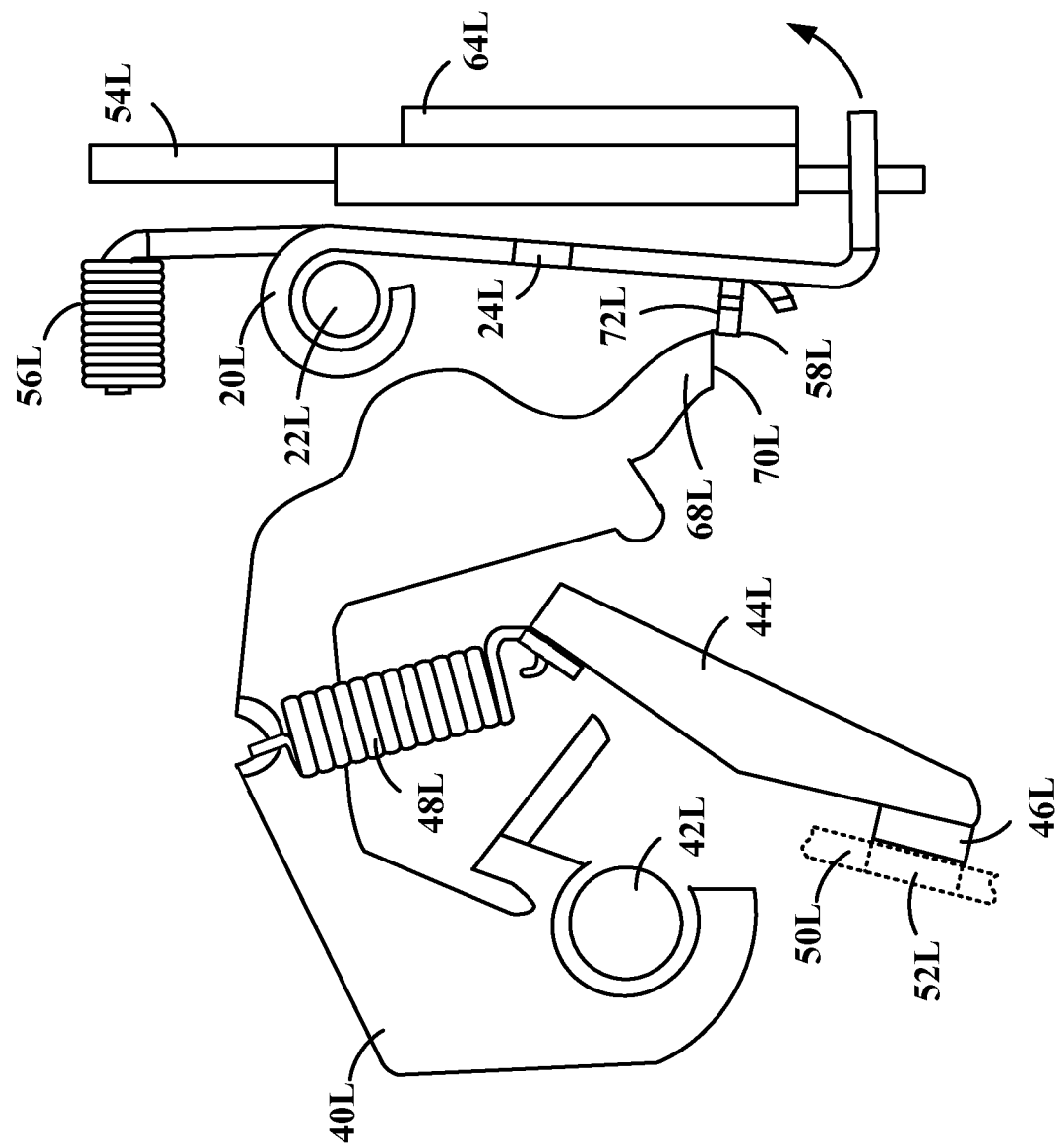

During an overload condition, current flowing through the breaker causes first bi-metal strip 54L to heat up and deflect, which causes first armature 20L to rotate in a counter-clockwise direction about first armature pivot 22L. As first armature 22L rotates, first top surface 72L pulls away from first surface 70L, decreasing the overlap area of the two surfaces, as shown in FIG. 2C. If the overcurrent condition persists, first bi-metal strip 54L continues to heat up and deflect, first armature 20L further rotates about first armature pivot 22L, and the surface area overlap between first top surface 72L and first surface 70L continues to decrease.

Figure 2D:
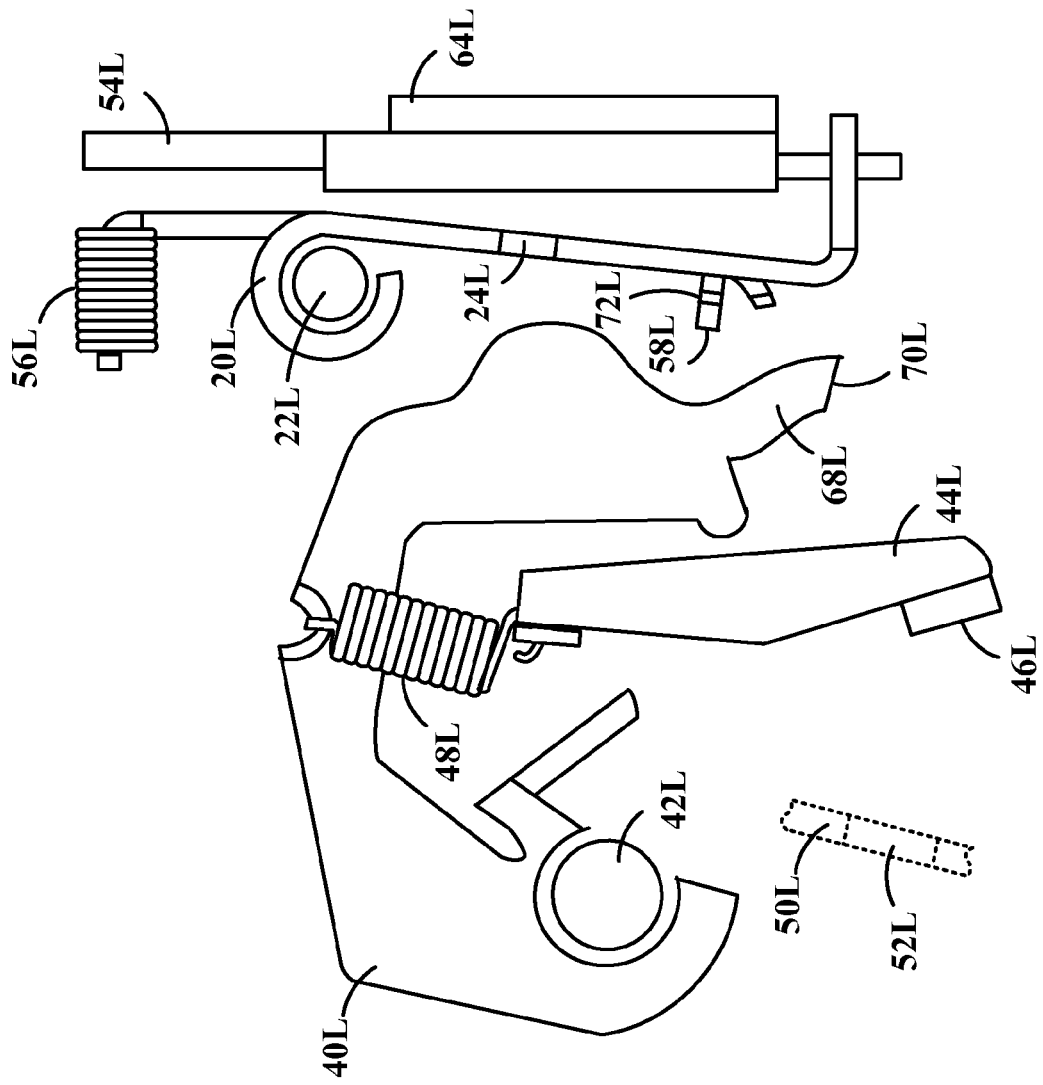

When the surface area overlap decreases to about zero, first cradle 40L rotates clockwise about first cradle pivot 42L, and first extension spring 48L rotates first moveable bus 44L counter-clockwise to separate first moveable contact 46L from first stationary contact 52L, unlatching first mechanical pole 14L. In the unlatched OFF configuration, first movable contact 46L and first stationary contact 52L are OPEN, as shown in FIG. 2D.

Likewise, during a short-circuit condition, current flowing through the breaker causes a magnetic field of first short-circuit sensing element 64L to increase, which causes first armature 20L to rotate in a counter-clockwise direction about first armature pivot 22L, and the surface area overlap between first top surface 72L of first armature 20L and first surface 70L of first cradle 40L decreases to about zero. As a result, first cradle 40L rotates clockwise about first cradle pivot 42L, and first extension spring 48L rotates first moveable bus 44L counter-clockwise to separate first moveable contact 46L from first stationary contact 52L, unlatching first mechanical pole 14L. In the unlatched OFF configuration, first movable contact 46L and first stationary contact 52L are OPEN, as shown in FIG. 2D.

Figure 3:
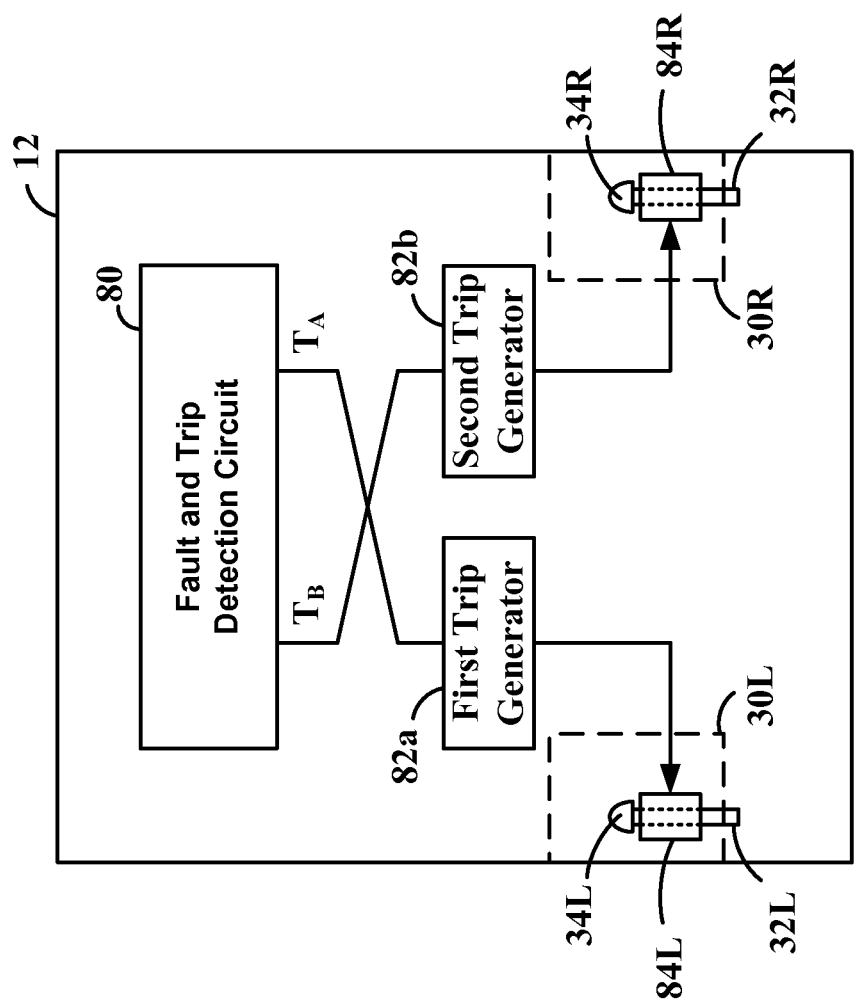
FIG. 3 is a diagram of example components of an electronic pole in accordance with this invention.

Referring now to FIG. 3, an example electronic pole 12 in accordance with this invention is described. Electronic pole 12 includes fault and trip detection circuit 80, and first and second trip generator circuits 82a and 82b, respectively. In addition, electronic pole 12 includes a first solenoid 84L disposed in first aperture 30L and a second solenoid 84R disposed in second aperture 30R. First solenoid 84L includes first solenoid plunger 32L having tip 34L, and second solenoid 84R includes second solenoid plunger 32R having tip 34R. Persons of ordinary skill in the art will understand that electronic poles typically include components in addition to the ones illustrated in FIG. 3. Such additional components have been omitted to avoid cluttering the drawing.

As described in more detail below, fault and trip detection circuit 80 monitors current and voltage on first and second mechanical poles 14L and 14R, respectively. If fault and trip detection circuit 80 detects no current or voltage on second mechanical pole 14R, fault and trip detection circuit 80 generates a first trip signal $T_A$ that has a value (e.g., HIGH) that causes first trip generator circuit 82a to energize first solenoid 84L to trip first mechanical pole 14L. In this regard, two-pole circuit breaker 10 common trips without using a trip bar. Otherwise, first trip signal $T_A$ has a second value (e.g., LOW), and first trip generator circuit 82a does not energize second solenoid 84L.

Likewise, if fault and trip detection circuit 80 detects no current or voltage on first mechanical pole 14L, fault and trip detection circuit 80 generates a second trip signal $T_B$ that has a first value (e.g., HIGH) that causes second trip generator circuit 82b to energize second solenoid 84R to trip second mechanical pole 14R. Otherwise, second trip signal $T_B$ has a second value (e.g., LOW), and second trip generator circuit 82b does not energize second solenoid 84R.

In addition, fault and trip detection circuit 80 also may include hardware and/or software for ground fault and/or arc fault detection. In such embodiments, if fault and trip detection circuit 80 detects a ground fault and/or an arc fault on first mechanical pole 14L or second mechanical pole 14R, fault and trip detection circuit 80 generates first and second trip signals $T_A$ and $T_B$ that each have a first value (e.g., HIGH) that cause first trip generator circuit 82a to energize first solenoid 84L to trip first mechanical pole 14L and second trip generator circuit 82b to energize second solenoid 84R to trip second mechanical pole 14R.

Figure 4A:
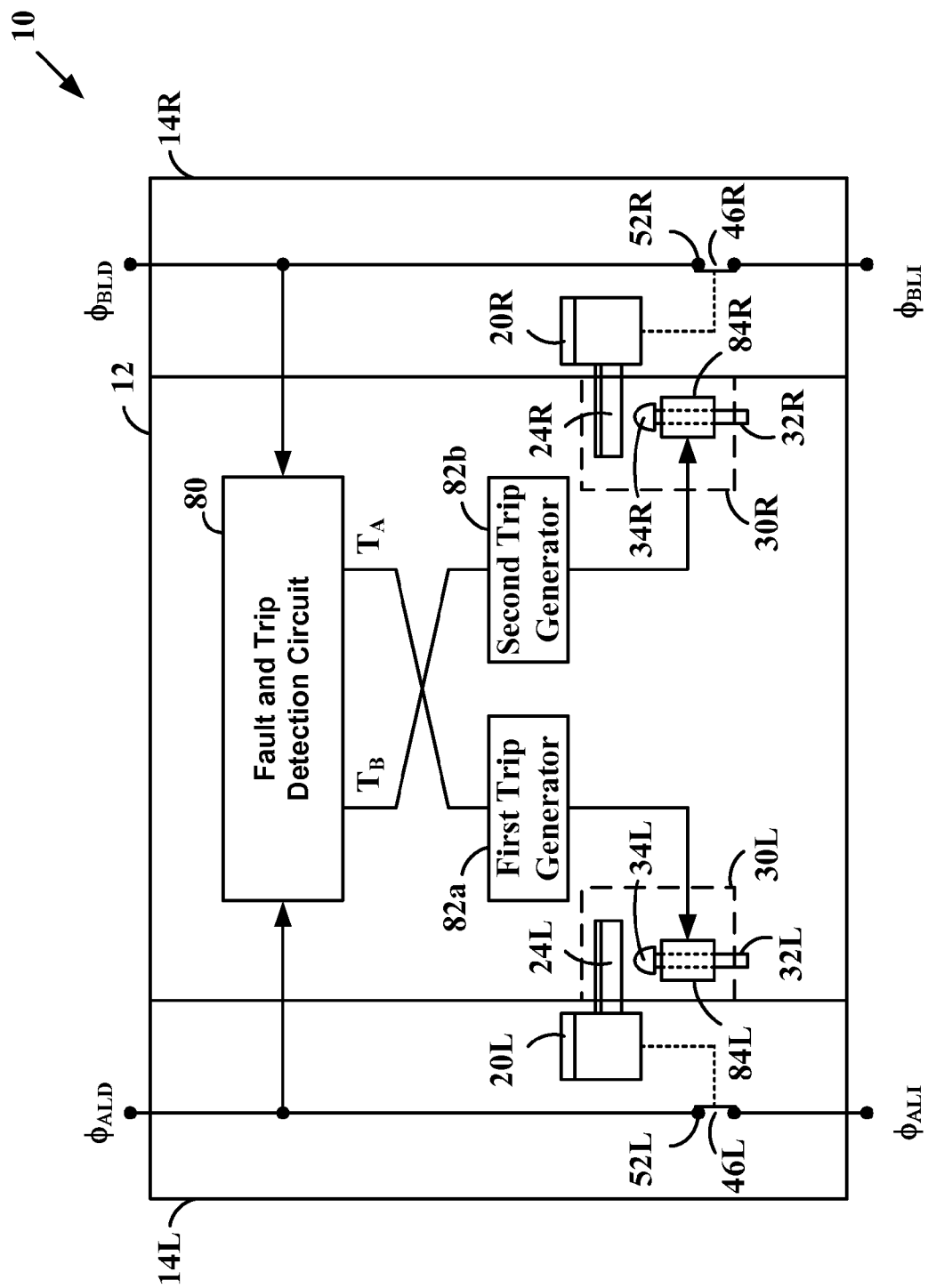
FIGS. 4A-4E are diagrams illustrating an example operation of two-pole circuit breakers in accordance with this invention.

FIGS. 4A-4E illustrate the operation of two-pole circuit breaker 10. In particular, FIG. 4A illustrates electronic pole 12 coupled between first mechanical pole 14L and second mechanical pole 14R to form two-pole circuit breaker 10. To simplify the drawings, only a few components of first mechanical pole 14L and second mechanical pole 14R are shown, and connections to a neutral bus are not shown. Persons of ordinary skill in the art will understand that electronic pole 12 typically will be coupled to a neutral bus, as described below.

First mechanical pole 14L is coupled to first line and load terminals $\phi_{ALI}$ and $\phi_{ALD}$, respectively, and second mechanical pole 14R is coupled to second line and load terminals $\phi_{BLI}$ and $\phi_{BLD}$, respectively. First armature extension 24L of first mechanical pole 14L extends into first aperture 30L of electronic pole 12, and is disposed adjacent tip 34L of solenoid plunger 32L. Second armature extension 24R of second mechanical pole 14R extends into second aperture 30R of electronic pole 12, and is disposed adjacent tip 34R of solenoid plunger 32R. Fault and trip detection circuit 80 is coupled to load terminals $\phi_{BLI}$ and $\phi_{BLD}$.

First armature 20L is coupled to first moveable contact 46L, and second armature 20R is coupled to second moveable contact 46R. As shown in FIG. 4A, first mechanical pole 14L is latched ON, with first moveable contact 46L and first stationary contact 52L CLOSED, and second mechanical pole 14R is latched ON, with second moveable contact 46R and second stationary contact 52R CLOSED. In this configuration, first line and load terminals $\phi_{ALI}$ and $\phi_{ALD}$, respectively, are coupled together, and second line and load terminals $\phi_{BLI}$ and $\phi_{BLD}$, respectively, are coupled together.

Figure 5A:
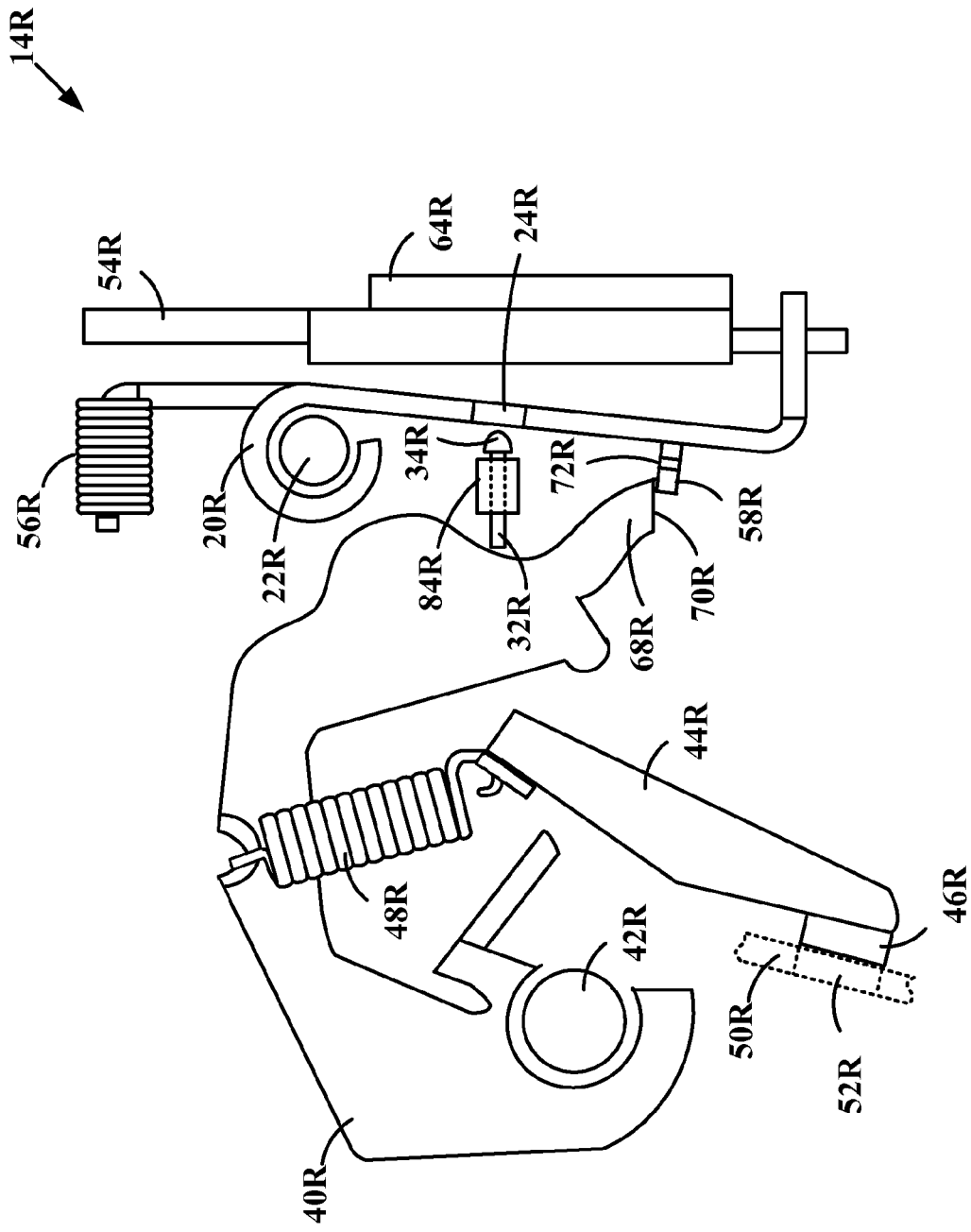
FIGS. 5A-5C are diagrams illustrating an example operation of two-pole circuit breakers in accordance with this invention.

FIG. 5A illustrates a view of selected components of electronic pole 12 and second mechanical pole 14R in this configuration. Persons of ordinary skill in the art will understand that the configuration of electronic pole 12 and first mechanical pole 14L is similar, albeit with "L" reference numbers.

Figure 4B:
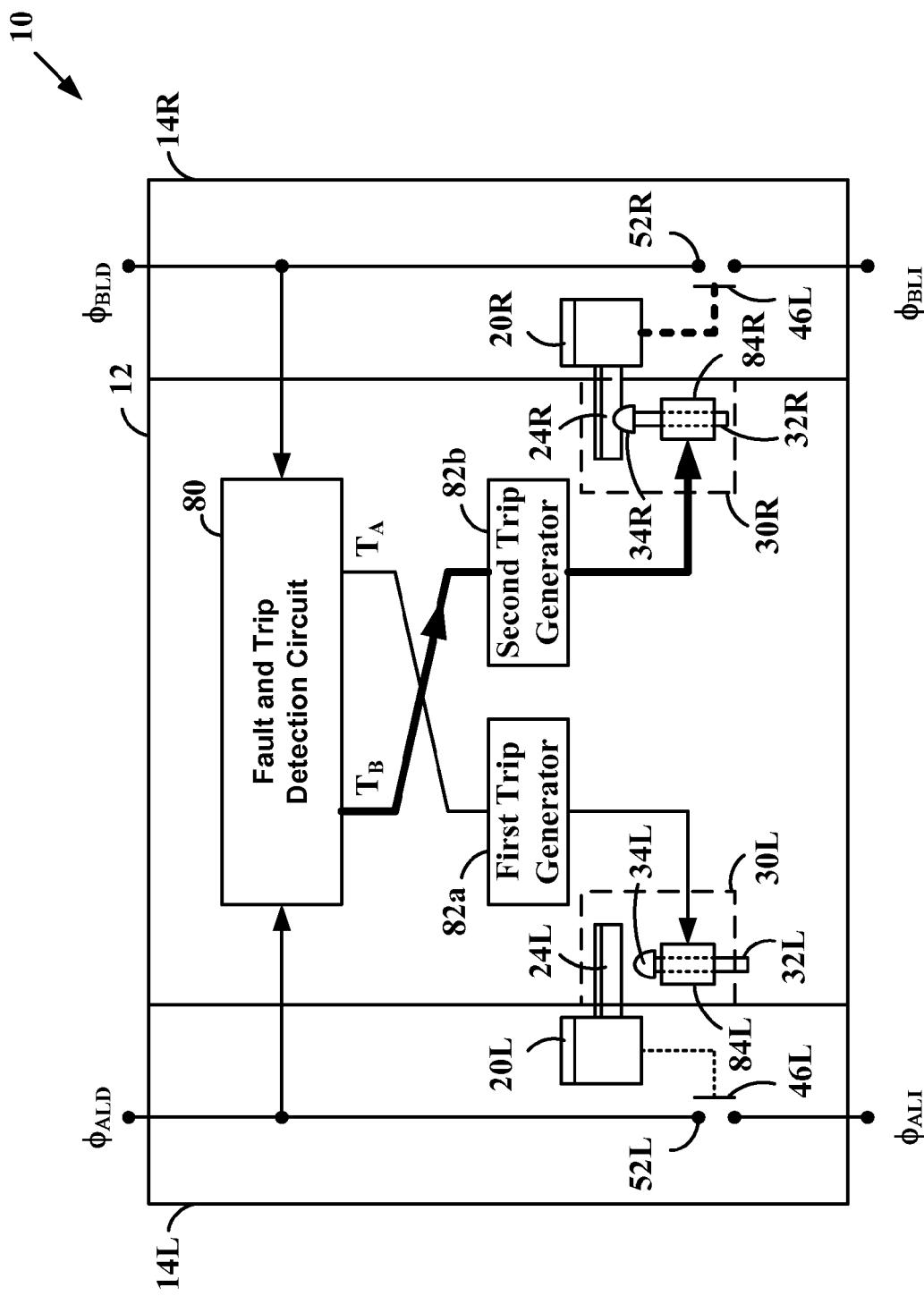

Referring again to FIG. 4A, if an overcurrent or short circuit occurs on first mechanical pole 14L, first moveable contact 46L separates from first stationary contact 52L, unlatching first mechanical pole 14L, no current flows from $\phi_{ALI}$ to $\phi_{ALD}$, and the voltage at $\phi_{ALD}$ drops to zero. As shown in FIG. 4B, fault and trip detection circuit 80 detects no current and no voltage on first mechanical pole 14L, and generates second trip signal $T_B$ having a first value (e.g., HIGH) that causes second trip generator circuit 82b to energize second solenoid 84R. When second solenoid 84R is energized, tip 34R of solenoid plunger 32R moves towards and pushes against second armature extension 24R of second mechanical pole 14R.

Figure 5B:
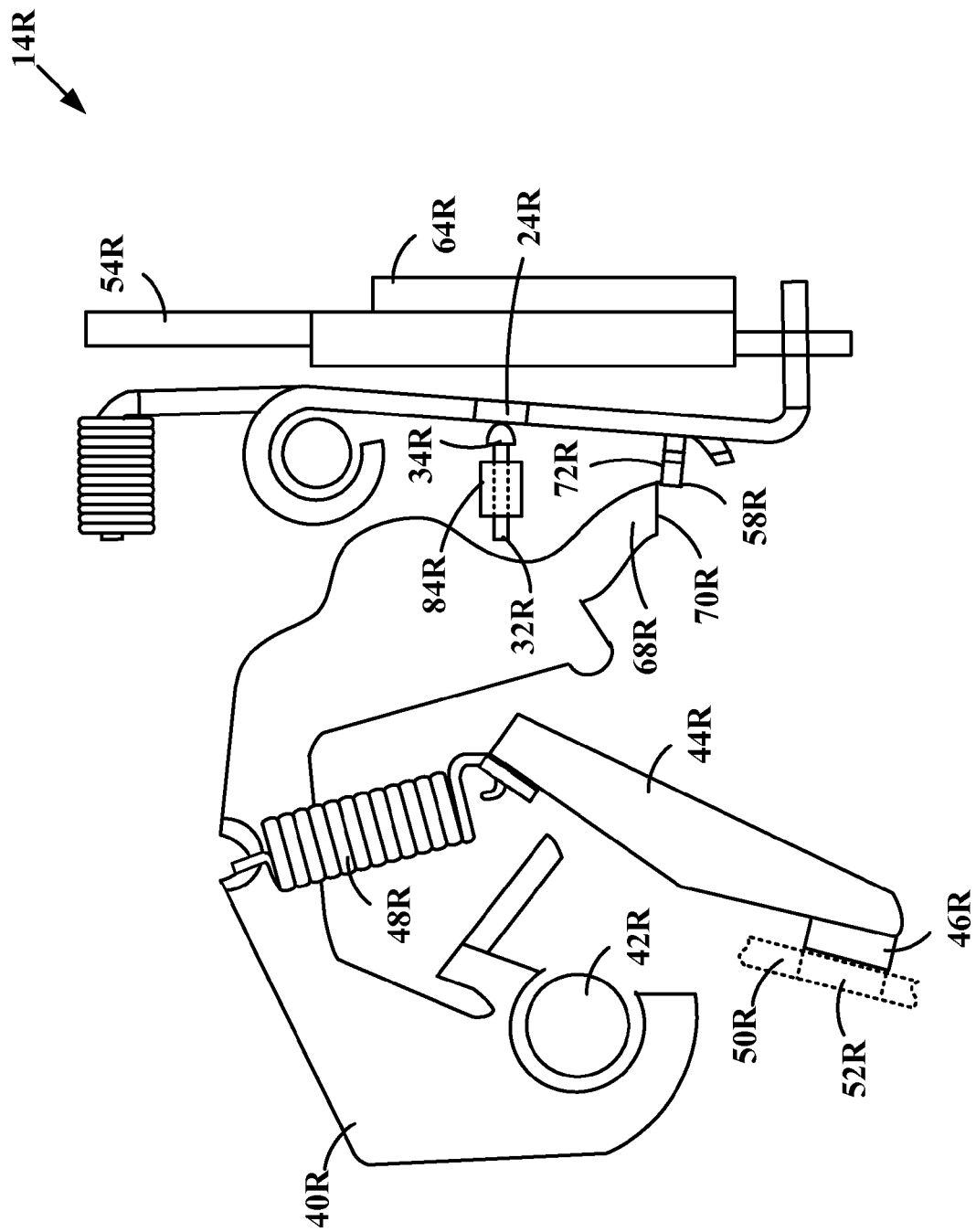
Figure 5C:
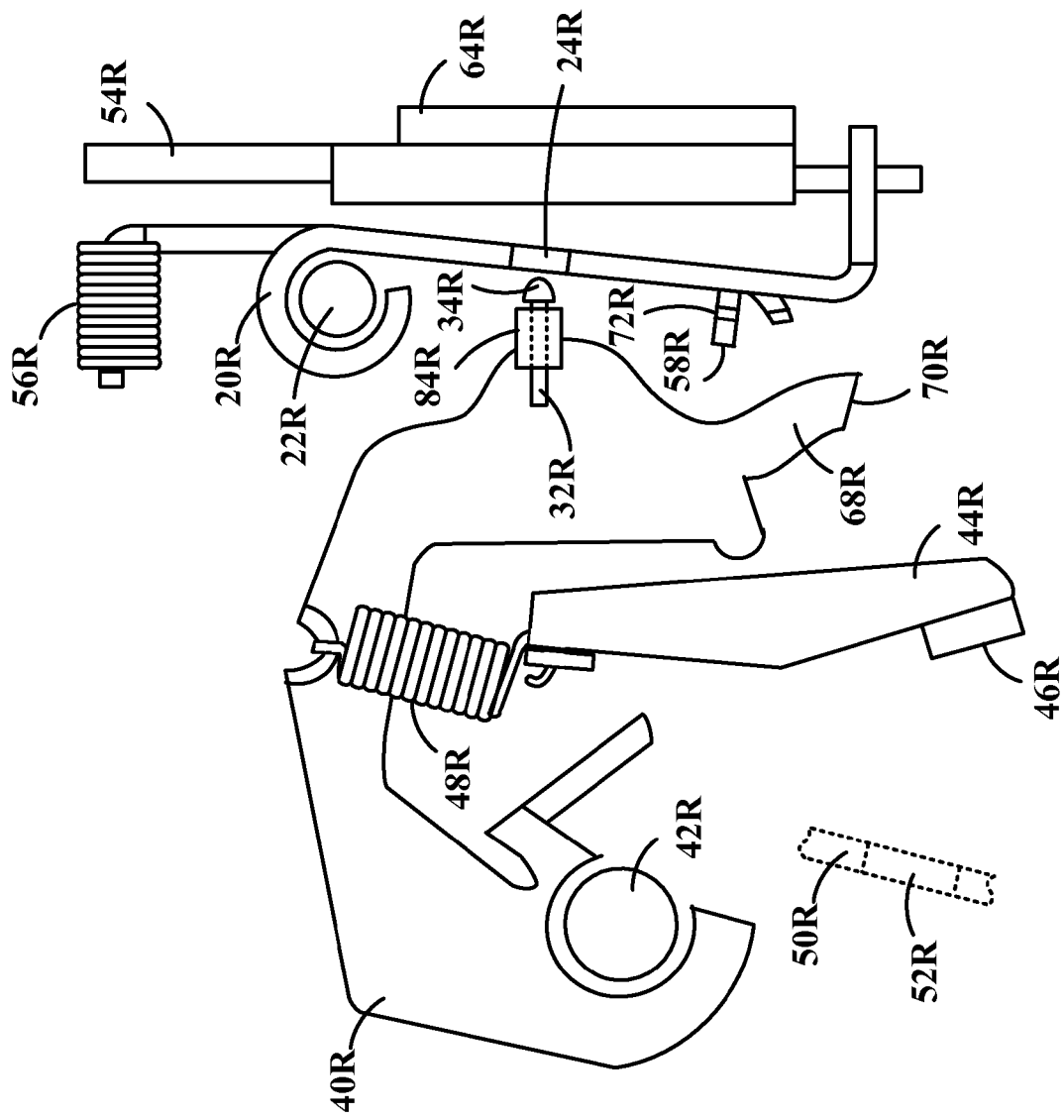

As shown in FIGS. 5B-5C, as tip 34R pushes against second armature extension 24R, second armature 20R rotates in a counter-clockwise direction about second armature pivot 22R, and the surface area overlap between second top surface 72R of second armature 20R and second surface 70R of second cradle 40R decreases to about zero. As a result, second cradle 40R rotates clockwise about second cradle pivot 42R, and second extension spring 48R rotates second moveable bus 44R counter-clockwise to separate second moveable contact 46R from second stationary contact 52R, unlatching second mechanical pole 14R. Thus, an overcurrent or short circuit fault on first mechanical pole 14L results in a common trip of first mechanical pole 14L and second mechanical pole 14R without using a trip bar.

Figure 4C:
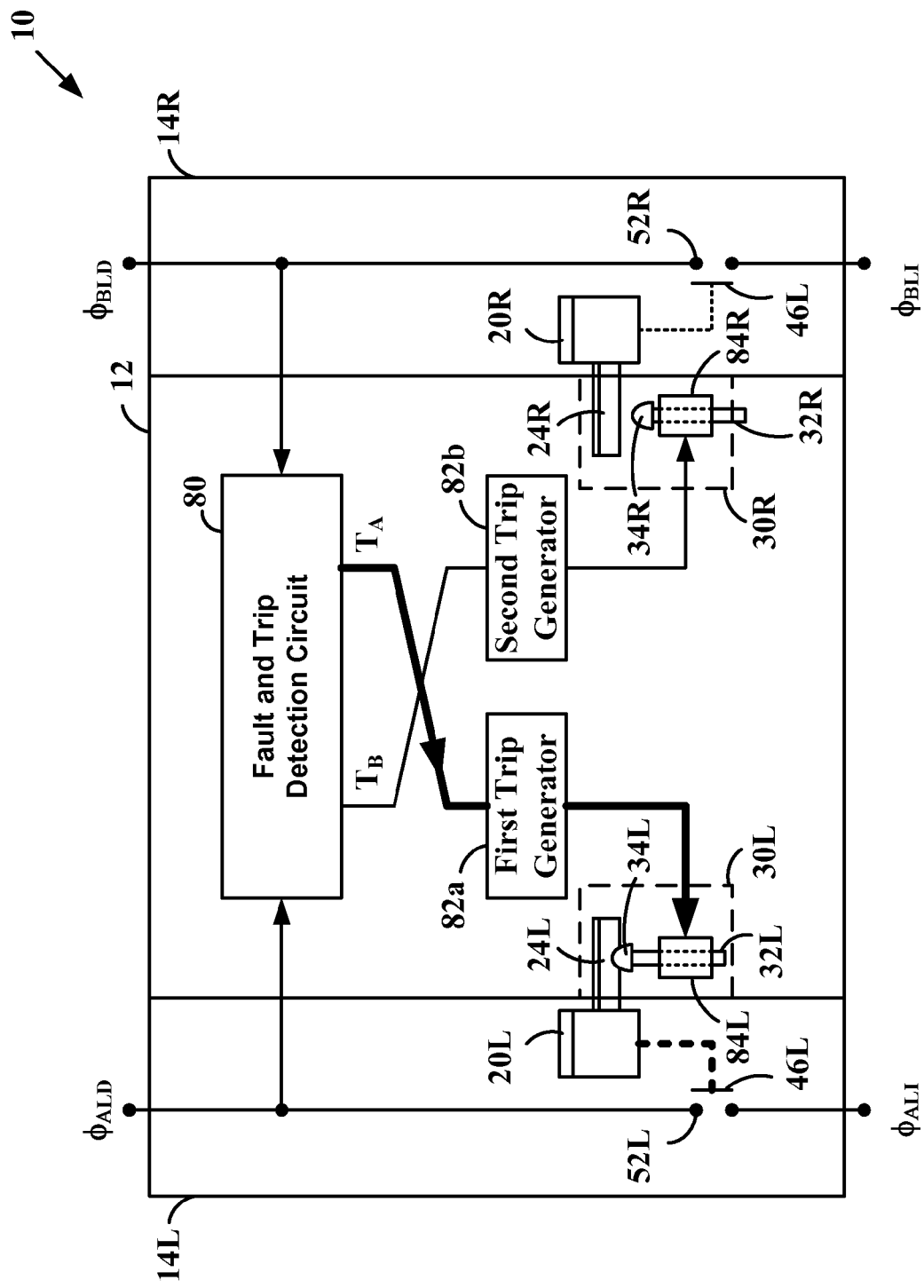

Referring again to FIG. 4A, if an overcurrent or short circuit occurs on second mechanical pole 14R, second moveable contact 46R separates from second stationary contact 52R, unlatching second mechanical pole 14R, no current flows from $\phi_{BLI}$ to $\phi_{BLD}$, and the voltage at $\phi_{BLD}$ drops to zero. As shown in FIG. 4C, fault and trip detection circuit 80 detects no current and no voltage on second mechanical pole 14R, and generates first trip signal $T_A$ having a first value (e.g., HIGH) that causes first trip generator circuit 82a to energize first solenoid 84L. When first solenoid 84L is energized, tip 34L of solenoid plunger 32L moves towards and pushes against first armature extension 24L of first mechanical pole 14L.

As shown in FIGS. 5B-5C (but replacing all "R" references with "L" references, as tip 34L pushes against first armature extension 24L, first armature 20L rotates in a counter-clockwise direction about first armature pivot 22L, and the surface area overlap between first top surface 72L of first armature 20L and first surface 70L of first cradle 40L decreases to about zero. As a result, first cradle 40L rotates clockwise about first cradle pivot 42L, and first extension spring 48L rotates first moveable bus 44L counter-clockwise to separate first moveable contact 46L from first stationary contact 52L, unlatching first mechanical pole 14L. Thus, a overcurrent or short circuit fault on second mechanical pole 14R results in a common trip of first mechanical pole 14L and second mechanical pole 14R without using a trip bar.

Figure 4D:
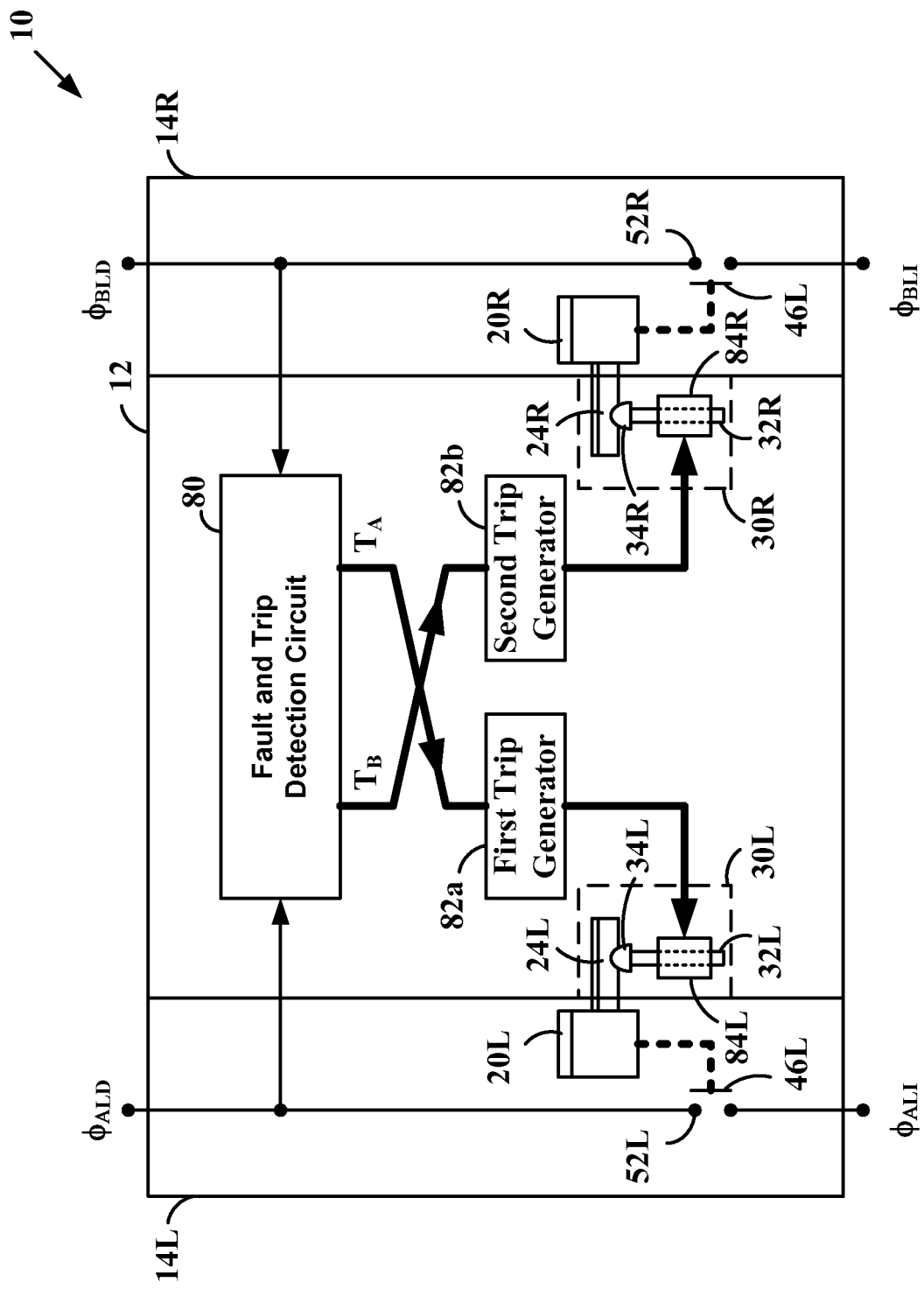

Referring now to FIG. 4D, if fault and trip detection circuit 80 includes hardware and/or software for ground fault and/or arc fault detection, and if fault and trip detection circuit 80 detects an arc fault or a ground on first mechanical pole 14L and/or second mechanical pole 14R, fault and trip detection circuit 80 generates first and second trip signals $T_A$ and $T_B$ that each have a first value (e.g., HIGH) that cause first trip generator circuit 82a to energize first solenoid 84L, and second trip generator circuit 82b to energize second solenoid 84R. When first solenoid 84L and second solenoid 84R are energized, tip 34L of solenoid plunger 32L moves towards and pushes against first armature extension 24L of first mechanical pole 14L, and tip 34R of solenoid plunger 32R moves towards and pushes against second armature extension 24R of second mechanical pole 14R.

As described above, when tip 34L pushes against first armature extension 24L, and tip 34R pushes against armature extension 24R, first moveable contact 46L separates from first stationary contact 52L, unlatching first mechanical pole 14L, and second moveable contact 46R separates from second stationary contact 52R, unlatching second mechanical pole 14R. Thus, an arc fault or a ground fault on first mechanical pole 14L and/or second mechanical pole 14R results in a common trip of first mechanical pole 14L and second mechanical pole 14R without using a trip bar.

Figure 4E:
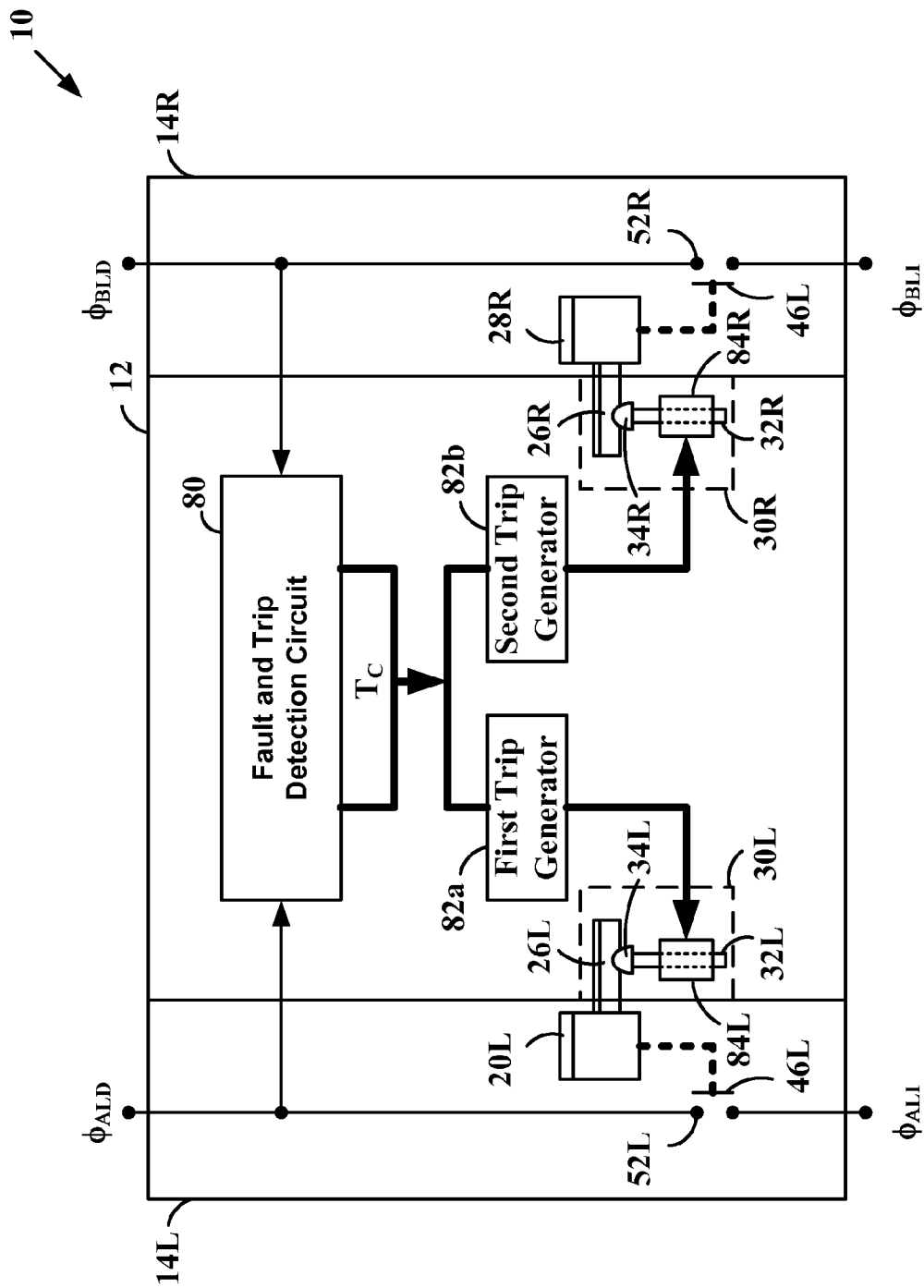

Persons of ordinary skill in the art will understand that fault and trip detection circuit 80 may generate a single common trip signal $T_C$ coupled to first trip generator circuit 82a and second trip generator circuit 82b, as shown in FIG. 4E. If fault and trip detection circuit 80 detects no current and no voltage on first mechanical pole 14L, or no current and no voltage on second mechanical pole 14R, or an arc fault or a ground fault occur on first mechanical pole 14L and/or second mechanical pole 14R, fault and trip detection circuit 80 generates common trip signal $T_C$ that has a first value (e.g., HIGH) that causes first trip generator circuit 82a to energize first solenoid 84L, and second trip generator circuit 82b to energize second solenoid 84R.

As a result, tip 34L pushes against first armature extension 24L, and tip 34R pushes against second armature extension 24R, first moveable contact 46L separates from first stationary contact 52L, unlatching first mechanical pole 14L, and second moveable contact 46R separates from second stationary contact 52R, unlatching second mechanical pole 14R. Thus, an overcurrent or short circuit, or an arc fault or a ground fault on first mechanical pole 14L and/or second mechanical pole 14R results in a common trip of first mechanical pole 14L and second mechanical pole 14R without using a trip bar.

Figure 6A:
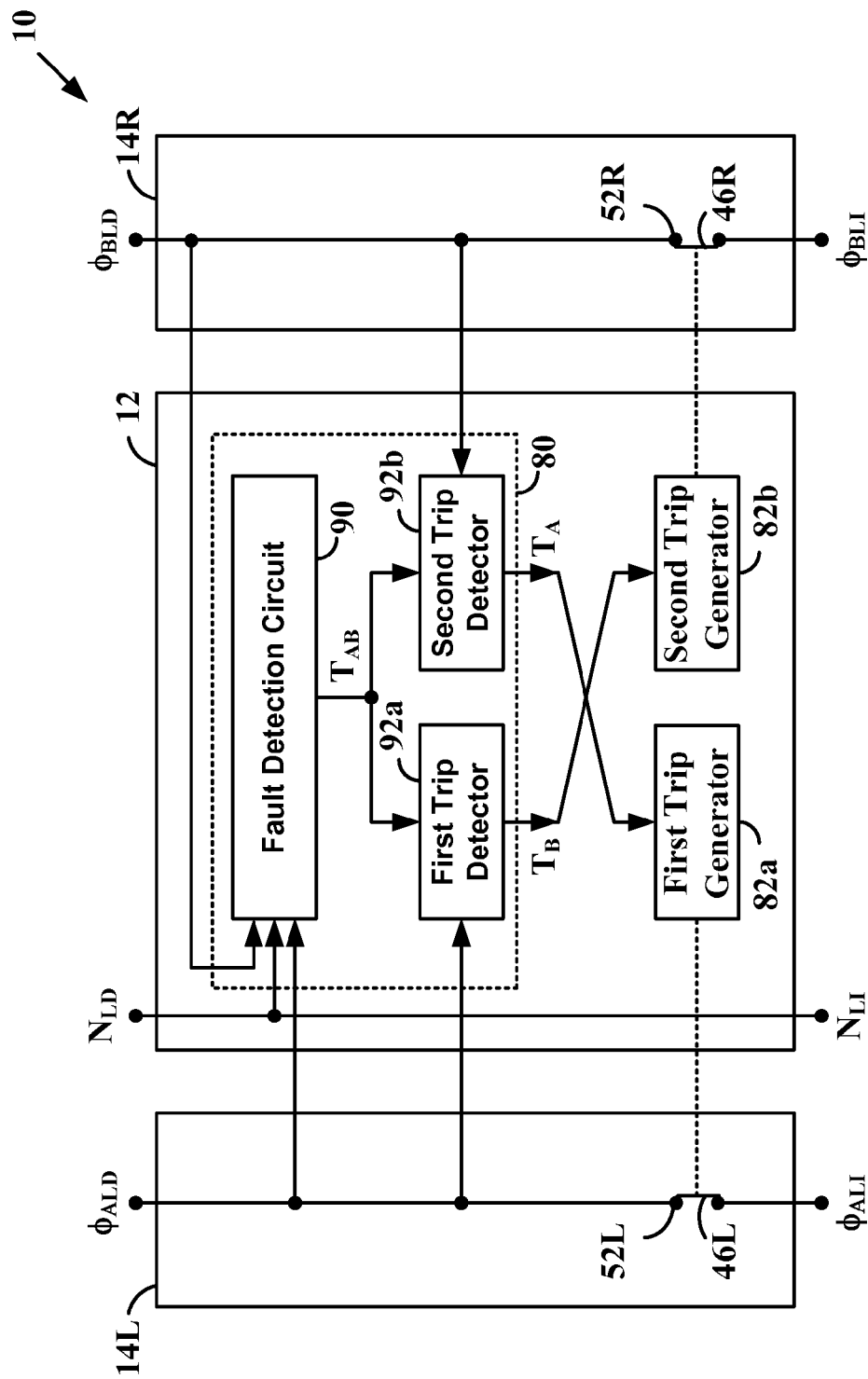
FIGS. 6A-6C are block diagrams illustrating example components of two-pole circuit breakers in accordance with this invention.
Figure 6B:
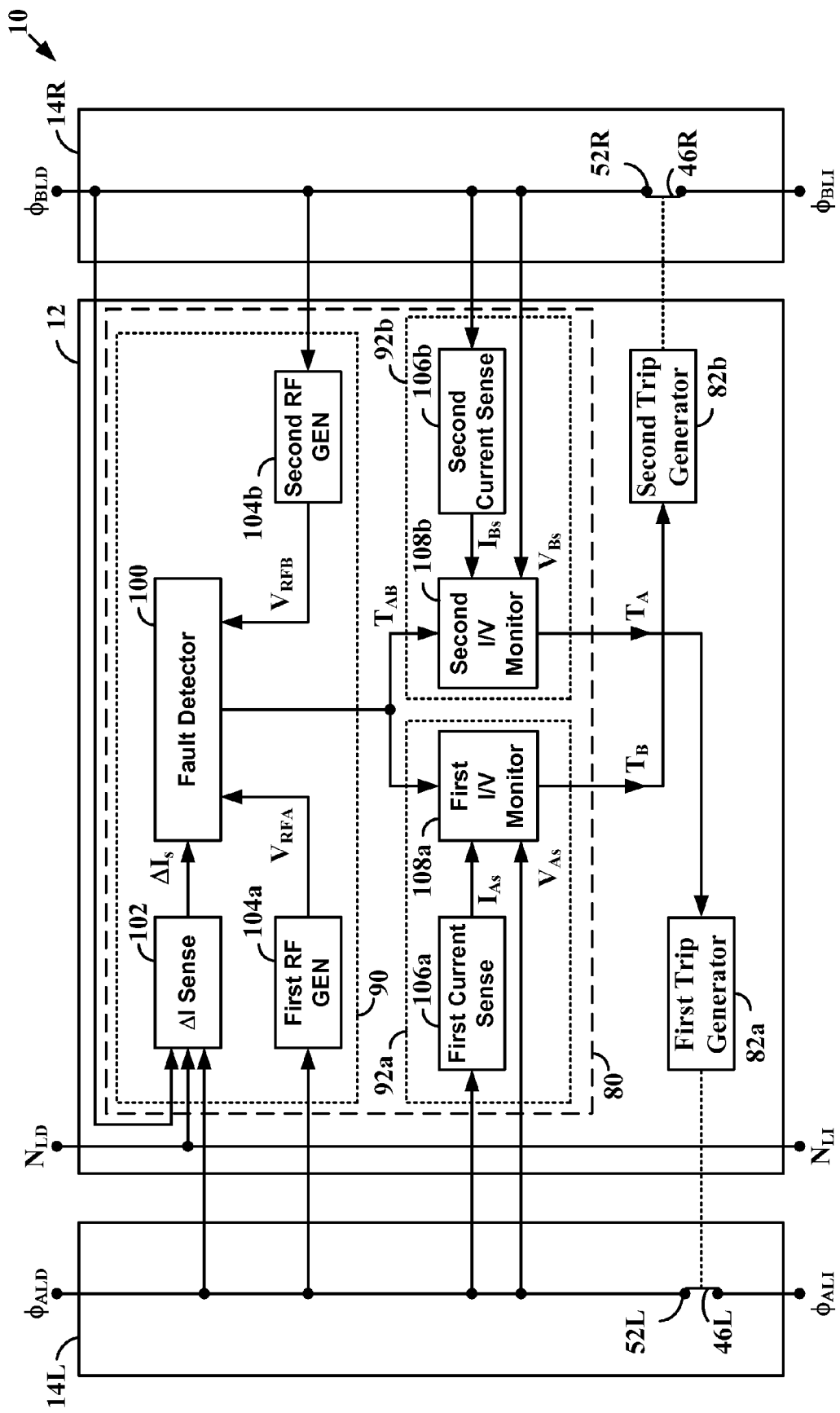
Figure 6C:
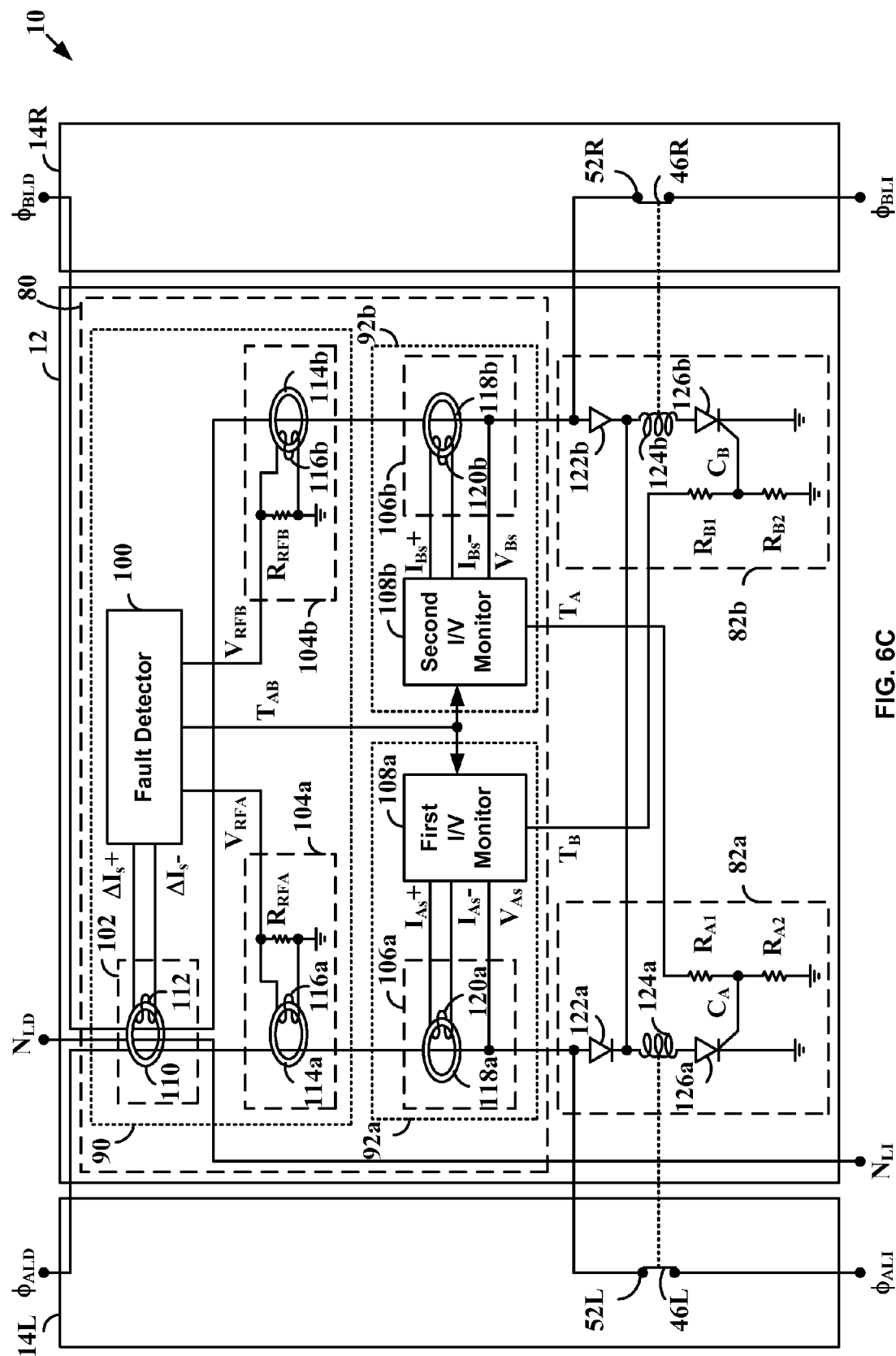

Referring now to FIGS. 6A-6C, example embodiments of electronic pole 12 are described that include ground fault and/or arc fault detection capability. As shown in FIG. 6A, example electronic pole 12 includes fault and trip detection circuit 80, and first and second trip generator circuits 82a and 82b, respectively. To simplify the drawings, first solenoid 84L, second solenoid 84R and first and second armatures 20L and 20R, respectively, are not shown.

Fault and trip detection circuit 80 includes a fault detection circuit 90, a first trip detector circuit 92a and a second trip detector circuit 92b. Fault detection circuit 90 is coupled to load terminals $\phi_{ALD}$ and $\phi_{BLD}$ and a load side of neutral terminal $N_{LD}$. Fault detection circuit 90 monitors current and voltage on first and second mechanical poles 14L and 14R, respectively. Fault detection circuit 90 generates an output signal $T_{AB}$ that is coupled to first trip detector circuit 92a and second trip detector circuit 92b. As described in more detail below, if fault detection circuit 90 detects a ground fault and/or an arc fault on either of load terminals $\phi_{ALD}$ or $\phi_{BLD}$, output signal $T_{AB}$ has a first value (e.g., HIGH). Otherwise, output signal $T_{AB}$ has a second value (e.g., LOW).

First trip detector circuit 92a monitors current and voltage on first mechanical pole 14L. If first trip detector circuit 92a detects no current or voltage on first mechanical pole 14L, or receives a signal $T_{AB}$ having a first value (e.g., HIGH) from fault detection circuit 90, first trip detector circuit 92a generates second trip signal $T_B$ having a first value (e.g., HIGH) that causes second trip generator circuit 82b to trip second mechanical pole 14R.

Likewise, second trip detector circuit 92b monitors current and voltage on second mechanical pole 14R. If second trip detector circuit 92b detects no current or voltage on second mechanical pole 14R, or receives a signal $T_{AB}$ having a first value (e.g., HIGH) from fault detection circuit 90, second trip detector circuit 92b generates first trip signal $T_A$ having a first value (e.g., HIGH) that causes first trip generator circuit 82a to trip first mechanical pole 14L.

Referring now to FIG. 6B, a more detailed example embodiment of electronic pole 12 is described. In particular, fault detection circuit 90 includes a fault detector 100 and a differential current detector circuit 102, and optionally includes a first RF generator circuit 104a and a second RF generator circuit 104b. Fault detector 100 may be a microprocessor or other similar processing device that may be used to detect ground faults and/or arc faults on load terminals $\phi_{ALD}$ and $\phi_{BLD}$.

Differential current detector circuit 102 has inputs coupled to load terminals $\phi_{ALD}$ and $\phi_{BLD}$, and load side neutral terminal $N_{LD}$, and has an output $\Delta I_S$ coupled to fault detector 100. Differential current detector circuit 102 senses current imbalances $\Delta I_S$ in the line and neutral conductors resulting from ground leakage current through an unintended ground circuit path other than the neutral conductor. Fault detector 100 interprets a non-zero $\Delta I_S$ signal as a ground fault, and generates signal $T_{AB}$ that has a first value (e.g., HIGH) to trip first mechanical pole 14L and second mechanical pole 14R.

In example embodiments of electronic pole 12 that provide arc fault detection in addition to or instead of ground fault detection, fault detection circuit 90 includes first RF generator circuit 104a and second RF generator circuit 104b. First RF generator circuit 104a is coupled to load terminal $\phi_{ALD}$, and provides a first RF output signal $V_{RFA}$ to fault detector 100. Second RF generator circuit 104b is coupled to load terminal $\phi_{BLD}$, and provides a second RF output signal $V_{RFB}$ to fault detector 100.

Fault detector 100 analyzes differential current signal $\Delta I_S$, and first and second RF output signals $V_{RFA}$ and $V_{RFB}$, respectively, to identify arc fault signatures. If fault detector 100 identifies such an arc fault signature, fault detector 100 generates signal $T_{AB}$ that has a first value (e.g., HIGH) to trip first mechanical pole 14L and second mechanical pole 14R.

First trip detector 92a includes first current sense circuit 106a and first I/V monitor circuit 108a, and second trip detector 92b includes second current sense circuit 106b and second I/V monitor circuit 108b. First current sense circuit 106a is coupled to load terminal $\phi_{ALD}$, and generates a first current signal $I_{AS}$ proportional to current flowing from $\phi_{ALI}$ to $\phi_{ALD}$. Second current sense circuit 106b is coupled to load terminal $\phi_{BLD}$, and generates a second current signal $I_{BS}$ proportional to current flowing from $\phi_{BLI}$ to $\phi_{BLD}$.

First I/V monitor circuit 108a is coupled to receive first current signal $I_{AS}$ from first current sense circuit 106a, and is coupled to receive a first voltage $V_{AS}$ of load terminal $\phi_{ALD}$ and signal $T_{AB}$ from fault detector 100. If first current signal $I_{AS}$ and first voltage $V_{AS}$ are substantially zero (indicating a trip of first mechanical pole 14L), or if signal $T_{AB}$ has a first value (e.g., HIGH) (indicating an arc fault and/or a ground fault on first mechanical pole 14L or second mechanical pole 14R), first I/V monitor circuit 108a generates second trip signal $T_B$ having a first value (e.g., HIGH) that causes second trip generator circuit 82b to trip second mechanical pole 14R.

Likewise, second I/V monitor circuit 108b is coupled to receive second current signal $I_{BS}$ from second current sense circuit 106b, and is coupled to receive a second voltage $V_{BS}$ of load terminal $\phi_{BLD}$ and signal $T_{AB}$ from fault detector 100. If second current signal $I_{BS}$ and second voltage $V_{BS}$ are zero (indicating a trip of second mechanical pole 14R), or if signal $T_{AB}$ has a first value (e.g., HIGH) (indicating an arc fault and/or a ground fault on first mechanical pole 14L or second mechanical pole 14R), second I/V monitor circuit 108b generates first trip signal $T_A$ having a first value (e.g., HIGH) that causes first trip generator circuit 82a to trip first mechanical pole 14L.

Referring now to FIG. 6C, an even more detailed example embodiment of electronic pole 12 is described. Differential current detector circuit 102 includes a differential current transformer 110 that has a secondary winding 112. Conductors from $\phi_{ALI}$ to $\phi_{ALD}$, $\phi_{BLI}$ to $\phi_{BLD}$, and $N_{LI}$ to $N_{LD}$ pass through the torroidal core of transformer 110 as single-turn primary windings. Secondary winding 112 is coupled to input terminals of fault detector 100, and provides differential current signals $\Delta I_S+$ and $\Delta I_S-$ to fault detector 100.

Persons of ordinary skill in the art will understand that other differential current transformers may be used, and that the conductors that pass through the torroidal core of transformer 110 alternatively may be configured as multiple-turn primary windings. Persons of ordinary skill in the art will understand that other differential current sensing circuits may be used.

Differential current detector circuit 102 senses current imbalances $\Delta I_S=(\Delta I_S+-\Delta I_S-)$ in the line and neutral conductors resulting from ground leakage current through an unintended ground circuit path other than the neutral conductor. Fault detector 100 interprets a non-zero $\Delta I_S$ signal as a ground fault, and generates signal $T_{AB}$ that has a first value (e.g., HIGH) to trip first mechanical pole 14L and second mechanical pole 14R.

First RF generator circuit 104a includes a first current transformer 114a that has a first secondary winding 116a. The conductor from $\phi_{ALI}$ to $\phi_{ALD}$ passes through the torroidal core of first current transformer 114a as a single-turn primary winding. First secondary winding 116a is coupled across a first resistor $R_{RFA}$, and generates first RF output signal $V_{RFA}$ coupled to fault detector 100. Persons of ordinary skill in the art will understand that other current sensing (e.g., a resistive shunt, a magnetic element or other similar device) and/or RF voltage generation circuits may be used.

Second RF generator circuit 104b includes a second current transformer 114b that has a second secondary winding 116b. The conductor from $\phi_{BLI}$ to $\phi_{BLD}$ passes through the torroidal core of second current transformer 114b as a single-turn primary winding. Second secondary winding 116b is coupled across a second resistor $R_{BFB}$, and generates second RF output signal $V_{RFB}$ coupled to fault detector 100. Persons of ordinary skill in the art will understand that other current sensing (e.g., a resistive shunt, a magnetic element or other similar device) and/or RF voltage generation circuits may be used.

Fault detector 100 analyzes differential current signal $\Delta I_S$, and first and second RF output signals $V_{RFA}$ and $V_{RFB}$, respectively, to identify arc fault signatures. If fault detector 100 identifies such an arc fault signature, fault detector 100 generates signal $T_{AB}$ that has a first value (e.g., HIGH) to trip first mechanical pole 14L and second mechanical pole 14R.

First current sense circuit 106a includes a third current transformer 118a that has a third secondary winding 120a. The conductor from $\phi_{ALI}$ to $\phi_{ALD}$ passes through the torroidal core of third current transformer 118a as a single-turn primary winding. Third secondary winding 120a conducts first current signal $I_{AS}=(I_{AS}+-I_{AS}-)$ proportional to current flowing from $\phi_{ALI}$ to $\phi_{ALD}$.

As described above, if first current signal $I_{AS}$ and first voltage $V_{AS}$ are zero (indicating a trip of first mechanical pole 14L), or if signal $T_{AB}$ has a first value (e.g., HIGH) (indicating an arc fault and/or a ground fault on first mechanical pole 14L or second mechanical pole 14R), first I/V monitor circuit 108a generates second trip signal $T_B$ having a first value (e.g., HIGH) that causes second trip generator circuit 82b to trip second mechanical pole 14R.

Second current sense circuit 106b includes a fourth current transformer 118b that has a fourth secondary winding 120b. The conductor from $\phi_{BLI}$ to $\phi_{BLD}$ passes through the torroidal core of fourth current transformer 118b as a single-turn primary winding. Fourth secondary winding 120b conducts second current signal $I_{BS}=(I_{BS}+-I_{BS}-)$ proportional to current flowing from $\phi_{BLI}$ to $\phi_{BLD}$.

As described above, if second current signal $I_{BS}$ and second voltage $V_{BS}$ are zero (indicating a trip of second mechanical pole 14R), or if signal $T_{AB}$ has a first value (e.g., HIGH) (indicating an arc fault and/or a ground fault on first mechanical pole 14L or second mechanical pole 14R), second I/V monitor circuit 108b generates first trip signal $T_A$ having a first value (e.g., HIGH) that causes first trip generator circuit 82a to trip first mechanical pole 14L.

First trip generator circuit 82a includes a first diode 122a, a first trip coil 124a, a first thyristor 126a, and first resistors $R_{A1}$ and $R_{A2}$. First resistors $R_{A1}$ and $R_{A2}$ form a resistor divider that generates a first trip command signal $C_A$ proportional to first trip signal $T_A$. If first trip signal $T_A$ has a first value (e.g., HIGH), first trip command signal $C_A$ causes first thyristor 126a to conduct, which in turn energizes first trip coil 124a, and causes contacts 46L and 52L to OPEN, and thereby interrupt AC power between $\phi_{ALI}$ and $\phi_{ALD}$.

Second trip generator circuit 82b includes a second diode 122b, a second trip coil 124b, a second thyristor 126b, and second resistors $R_{B1}$ and $R_{B2}$. Second resistors $R_{B1}$ and $R_{B2}$ form a resistor divider that generates a second trip command signal $C_B$ proportional to second trip signal $T_B$. If second trip signal $T_B$ has a first value (e.g., HIGH), second trip command signal $C_B$ causes second thyristor 126b to conduct, which in turn energizes second trip coil 124b, and causes contacts 46R and 52R to OPEN, and thereby interrupt AC power between $\phi_{BLI}$ and $\phi_{BLD}$.

Persons of ordinary skill in the art will understand that other circuit components may be used instead of first diode 122a, first trip coil 124a, first thyristor 126a, and first resistors $R_{A1}$ and $R_{A2}$. Likewise, persons of ordinary skill in the art will understand that other circuit components may be used instead of second diode 122b, second trip coil 124b, second thyristor 126b, and second resistors $R_{B1}$ and $R_{B2}$. In some embodiments, the electronic pole may be placed at any suitable location.

The foregoing merely illustrates the principles of this invention, and various modifications can be made by persons of ordinary skill in the art without departing from the scope and spirit of this invention.

The invention claimed is:

1. A multi-pole circuit breaker comprising:
    a first mechanical pole comprising a first armature having a first armature extension;
    a second mechanical pole comprising a second armature having a second armature extension; and
    an electronic pole comprising a first solenoid and a second solenoid, the electronic pole including a trip detection circuit including:
        a first current and voltage monitor circuit that monitors a first current and a first voltage on the first mechanical pole, and
        a second current and voltage monitor circuit that monitors a second current and a second voltage on the second mechanical pole,
        wherein the trip detection circuit generates a first trip signal to trip the second mechanical pole when the first current and the first voltage are substantially zero and the trip detection circuit generates a second trip signal to trip the first mechanical pole when the second current and the second voltage are substantially zero to common trip both the first mechanical pole and the second mechanical pole without using a trip bar in response to an arc fault and/or a ground fault that occurs on the first mechanical pole and/or the second mechanical pole,
    wherein the first armature extension is disposed adjacent the first solenoid, and the second armature is disposed adjacent the second solenoid.

2. The multi-pole circuit breaker of claim 1, wherein the first solenoid comprises a first solenoid plunger having a tip disposed adjacent the first armature extension, and the second solenoid comprises a second solenoid plunger having a tip disposed adjacent the second armature extension.

3. The multi-pole circuit breaker of claim 1, wherein the first mechanical pole comprises a first cradle, and the first armature comprises a first projection adapted to engage a first surface of the first cradle to latch the first mechanical pole ON.

4. The multi-pole circuit breaker of claim 3, wherein:
    the first armature is disposed about a first armature pivot; and
    when the first armature rotates about the first armature pivot, the first projection disengages the first surface to unlatch the first mechanical pole.

5. The multi-pole circuit breaker of claim 1, wherein the second mechanical pole comprises a second cradle, and the second armature comprises a second projection adapted to engage a second surface of the second cradle to latch the second mechanical pole ON.

6. The multi-pole circuit breaker of claim 5, wherein:
    the second armature is disposed about a second armature pivot; and
    when the second armature rotates about the second armature pivot, the second projection disengages the second surface to unlatch the second mechanical pole.

7. The multi-pole circuit breaker of claim 1, wherein the two-pole circuit breaker does not include a trip bar.

8. An electronic pole for use with a multi-pole circuit breaker having a first mechanical pole and a second mechanical pole, the electronic pole comprising:
    a trip detection circuit having a first output signal node and a second output signal node;
    a first trip generator circuit having an input coupled to the first output signal node; and
    a second trip generator circuit having an input coupled to the second output signal node;
    wherein the trip detection circuit provides a first output signal on the first output signal node when the first mechanical pole trips, and provides a second output signal on the second output signal node when the second mechanical pole trips, wherein the trip detection circuit including:
        a first current and voltage monitor circuit that monitors a first current and a first voltage on the first mechanical pole, and
        a second current and voltage monitor circuit that monitors a second current and a second voltage on the second mechanical pole,
        wherein the trip detection circuit generates a first trip signal to trip the second mechanical pole when the first current and the first voltage are substantially zero and the trip detection circuit generates a second trip signal to trip the first mechanical pole when the second current and the second voltage are substantially zero to common trip both the first mechanical pole and the second mechanical pole without using a trip bar in response to an arc fault and/or a ground fault that occurs on the first mechanical pole and/or the second mechanical pole.

9. The electronic pole of claim 8, wherein the trip detection circuit provides the first output signal on the first output signal node and the second output signal on the second output signal node when a fault occurs on the first mechanical pole and/or the second mechanical pole.

10. The electronic pole of claim 8, wherein the trip detection circuit includes an arc fault detector, and wherein the trip detection circuit provides the first output signal on the first output signal node and the second output signal on the second output signal node when an arc fault occurs on the first mechanical pole and/or the second mechanical pole.

11. The electronic pole of claim 8, wherein the trip detection circuit includes a ground fault detector, and wherein the trip detection circuit provides the first output signal on the first output signal node and the second output signal on the second output signal node when a ground fault occurs on the first mechanical pole and/or the second mechanical pole.

12. The electronic pole of claim 8, wherein the trip detection circuit includes a combination arc fault and ground fault circuit detector, and wherein the trip detection circuit provides the first output signal on the first output signal node and the second output signal on the second output signal node when an arc fault and/or a ground fault occurs on the first mechanical pole and/or the second mechanical pole.

13. The electronic pole of claim 8, wherein the trip detection circuit trips the second mechanical pole when an overcurrent or short circuit occurs on the first mechanical pole, without using a trip bar.

14. The electronic pole of claim 8, wherein the trip detection circuit trips the first mechanical pole when an overcurrent or short circuit occurs on the second mechanical pole, without using a trip bar.

15. A two-pole circuit breaker comprising:
a first mechanical pole;
a second mechanical pole; and
an electronic pole having a trip detection circuit comprising a fault detection circuit coupled to a first trip detector circuit and a second trip detector circuit, wherein the trip detection circuit including:
a first current and voltage monitor circuit that monitors a first current and a first voltage on the first mechanical pole, and
a second current and voltage monitor circuit that monitors a second current and a second voltage on the second mechanical pole,
wherein the trip detection circuit generates a first trip signal to trip the second mechanical pole when the first current and the first voltage are substantially zero and the trip detection circuit generates a second trip signal to trip the first mechanical pole when the second current and the second voltage are substantially zero to common trip both the first mechanical pole and the second mechanical pole without using a trip bar in response to an arc fault and/or a ground fault that occurs on the first mechanical pole and/or the second mechanical pole.

16. The two-pole circuit breaker of claim 15, wherein the trip detection circuit comprises an arc fault detector and/or a ground fault detector.

\* \* \* \* \*